United States Patent
Matsunaga et al.

(10) Patent No.: US 8,611,228 B2
(45) Date of Patent: Dec. 17, 2013

(54) ANOMALY DETECTION METHOD AND SYSTEM AND MAINTENANCE METHOD AND SYSTEM

(75) Inventors: Yasuhiko Matsunaga, Tokyo (JP); Junichi Takeuchi, Tokyo (JP); Takayuki Nakata, Tokyo (JP)

(73) Assignee: NEC Corporation, Tokyo (JP)

( * ) Notice: Subject to any disclaimer, the term of this patent is extended or adjusted under 35 U.S.C. 154(b) by 1217 days.

(21) Appl. No.: 11/914,156

(22) PCT Filed: Jun. 2, 2006

(86) PCT No.: PCT/JP2006/311088
§ 371 (c)(1),
(2), (4) Date: Nov. 12, 2007

(87) PCT Pub. No.: WO2006/129792
PCT Pub. Date: Dec. 7, 2006

(65) Prior Publication Data
US 2009/0052330 A1     Feb. 26, 2009

(30) Foreign Application Priority Data
Jun. 2, 2005    (JP) .................................. 2005-162378

(51) Int. Cl.
*H04L 12/26*    (2006.01)

(52) U.S. Cl.
USPC .......................................................... 370/242

(58) Field of Classification Search
USPC ........... 370/206–208, 232, 317, 242; 455/423
See application file for complete search history.

(56) References Cited

U.S. PATENT DOCUMENTS 5,581,544 A * 12/1996 Hamada et al. ................ 370/253
5,691,975 A * 11/1997 Hamada et al. ................ 370/232

(Continued)

FOREIGN PATENT DOCUMENTS

JP         10-308824 A      11/1998
JP         2001-101154 A    4/2001

(Continued)

OTHER PUBLICATIONS

3GPPTS32.403, "Telecommunication management; performance Management (PM); Performance measurements-UMTS and combined UMTS/GSM (Release5)",2004.
Lucent Technologies, "VitalSQM Service Quality Management Software Brochure", Nov. 5, 2003.

(Continued)

*Primary Examiner* — Mark Rinehart
*Assistant Examiner* — Mohammad Anwar
(74) *Attorney, Agent, or Firm* — Sughrue Mion, PLLC

(57) ABSTRACT

A network management apparatus in a mobile communication network holds a communication quality index in a normal operation and periodically receives input of a communication quality measurement result from a radio base station control apparatus. When a connection failure count f with respect to a connection request count a of each radio cell is obtained as a measurement result, letting $p_0$ be the call loss rate in the normal operation, an upper probability B of a binomial distribution representing the connection failure count becomes larger than f is obtained (step 524). The negative logarithm of the upper probability B is obtained as the score of the degree of abnormality (step 525). Anomaly of communication is detected when the score of the degree of abnormality exceeds a predetermined threshold value (steps 526 and 527). After that, maintenance control is executed in accordance with the calculated score of the degree of abnormality, thereby appropriately avoiding a fault of the communication system. This allows to calculate the degree of abnormality from the measurement result of the communication quality index in the mobile communication network in consideration of the statistical reliability and execute maintenance corresponding to the degree of abnormality.

40 Claims, 13 Drawing Sheets

(56) References Cited

U.S. PATENT DOCUMENTS

| | | | |
|---|---|---|---|
| 6,483,867 B1 * | 11/2002 | Mannermaa | 375/149 |
| 2003/0064720 A1 | 4/2003 | Valins et al. | |
| 2004/0057394 A1 * | 3/2004 | Holtzman | 370/317 |
| 2006/0045032 A1 * | 3/2006 | Hamada | 370/278 |

FOREIGN PATENT DOCUMENTS

| | | |
|---|---|---|
| JP | 2006-094497 A | 4/2006 |
| WO | 94/21068 | 9/1994 |
| WO | 03-005761 A1 | 1/2003 |

OTHER PUBLICATIONS

Shinsuke Muto, "Introduction to Statistical Analysis", Asakura Publishing Co., Ltd, pp. 172-173, 1995 Abstract.

"Method of Time Series Analysis", edited by Tohru Ozaki and Genshiro Kitagawa, Asakura Publishing Co., Ltd, pp. 61-71, 1998.

Cynthia S. Hood et al, "Proactive Network-Fault Detection", IEEE Transactions on Reliability, vol. 46, No. 3, pp. 333-341, Sep. 1997.

European Search Report, issued Feb. 15, 2012 by the European Patent Office in counterpart European Application No. 06747118.5.

Biglieri, Ezio et al. "Fading Channels: Information-Theoretic and Communications Aspects", IEEE Transactions on Information Theory, Oct. 1998, vol. 44, No. 6, pp. 2619-2692.

* cited by examiner

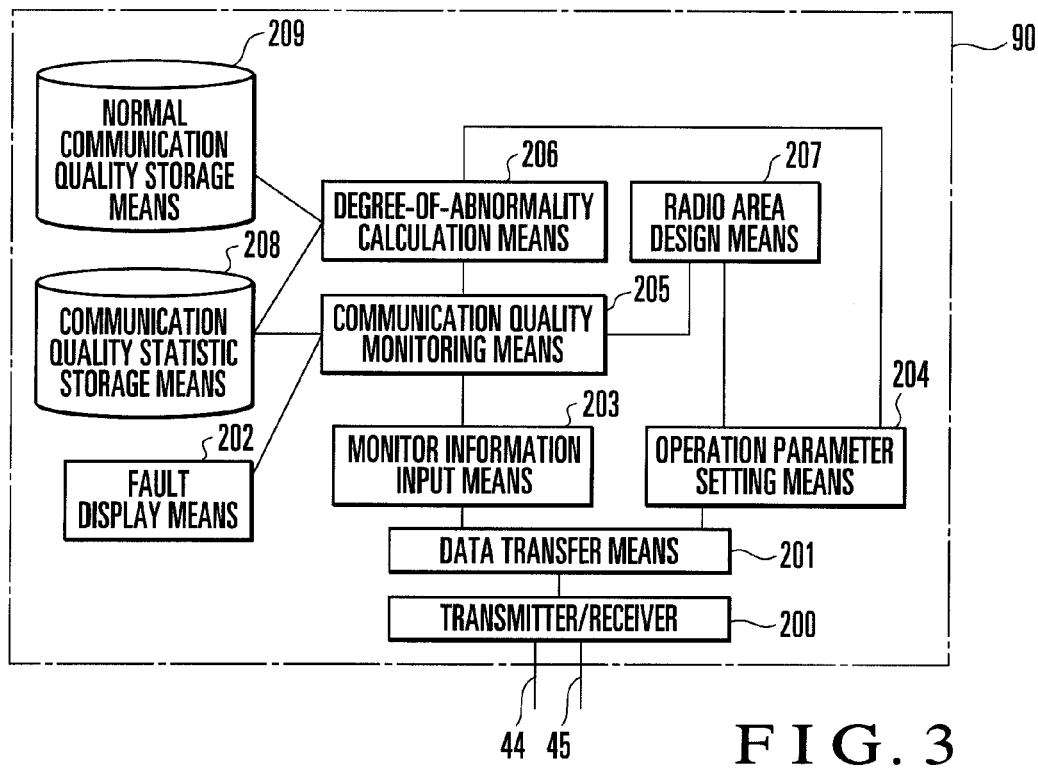

FIG. 3

| STATISTICAL ITEMS \ SERVICES | CIRCUIT-SWITCHED SPEECH COMMUNICATION 320 | CIRCUIT-SWITCHED TV PHONE 321 | CIRCUIT-SWITCHED DATA TRANSFER 322 | PACKET-SWITCHED DATA TRANSFER 323 |
|---|---|---|---|---|
| CONNECTION REQUEST COUNT 301 | 60 | 2 | 0 | 50 |
| CONNECTION FAILURE COUNT 302 | 2 | 0 | 0 | 1 |
| COMMUNICATION NORMAL TERMINATION COUNT 303 | 57 | 2 | 0 | 47 |
| COMMUNICATION ABNORMAL TERMINATION COUNT 304 | 1 | 0 | 0 | 2 |
| AVERAGE TRANSFER DELAY AMOUNT 305 | 80ms | 100ms | 100ms | 240ms |
| TRANSFER FRAME COUNT 306 | $5.1 \times 10^4$ | $2.0 \times 10^3$ | 0 | $1.2 \times 10^5$ |

FIG. 4

| COMMUNICATION QUALITY STATISTICAL ITEMS \ SERVICES | CIRCUIT-SWITCHED SPEECH COMMUNICATION 320 | CIRCUIT-SWITCHED TV PHONE 321 | CIRCUIT-SWITCHED DATA TRANSFER 322 | PACKET-SWITCHED DATA TRANSFER 323 |
|---|---|---|---|---|
| CALL LOSS RATE 331 | 2% | 2% | 2% | 1% |
| COMMUNICATION ABNORMAL TERMINATION RATE 332 | 3% | 3% | 3% | 5% |
| AVERAGE TRANSFER DELAY AMOUNT 333 | 150ms | 150ms | 150ms | 200ms |
| TRANSFER DELAY AMOUNT DISPERSION 334 | 8ms | 8ms | 20ms | 40ms |
330
F I G. 5
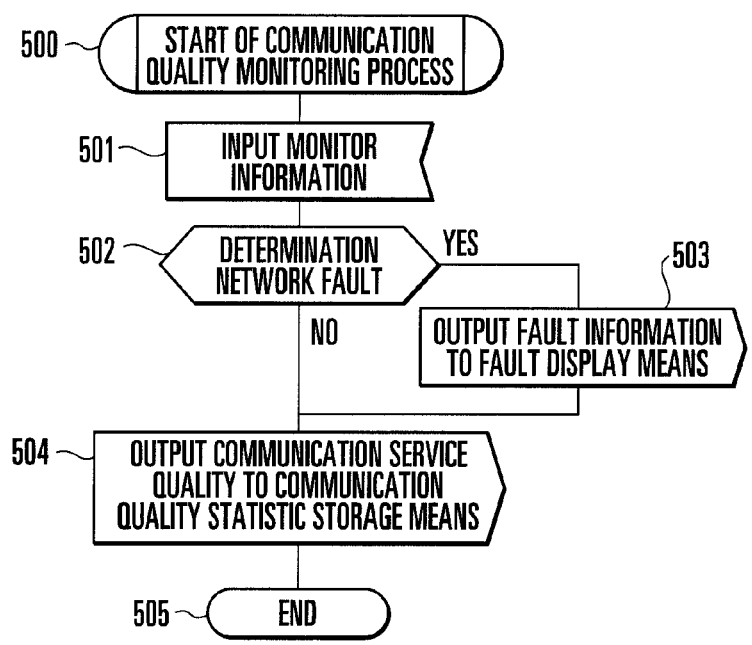
F I G. 6

ANOMALY DETECTION METHOD AND SYSTEM AND MAINTENANCE METHOD AND SYSTEM

TECHNICAL FIELD

The present invention relates to anomaly detection and maintenance in a communication network and, more particularly, to quantization of the degree of abnormality based on statistical reliability and control for maintenance based on the degree of abnormality.

BACKGROUND ART

In a communication network, generally, a telecommunications carrier acquires indices related to communication quality from a communication device and compares them with predetermined threshold values, thereby detecting abnormalities in the operation state of the network. If anomaly is detected, corresponding causes are analyzed, and maintenance is executed by, e.g., changing operation parameters. For example, in a mobile communication network based on 3GPP (3rd Generation Partnership Program) specifications, a radio base station control apparatus should periodically acquire, as communication quality indices for each radio cell, the ratio of the establishment failure count to the establishment attempt count of a radio access bearer, the ratio of the abnormal release count to the establishment success count of a radio access bearer, and the like. These communication quality indices are defined in reference 1 "3GPPTS32.403, "Telecommunication management; Performance Management (PM); Performance measurements-UMTS and combined UMTS/GSM (Release5)", 2004. [searched May 27, 2005], Internet <URL:http://www.3gpp.org/ftp/Specs/2004-12/Rel-5/32_series/32403-590.zip>".

These communication quality indices dynamically change depending on the arrangement of the communication network or measurement conditions. Especially, in a mobile communication network such as a portable phone, radio base stations are sometimes installed without forming any void in a planar service area of a region where the communication demand is not necessarily high, thereby increasing the convenience for users. For this reason, traffic greatly depends on the region and time. To detect an anomaly in the communication network, it is necessary not only to appropriately set the threshold values for anomaly determination but also to statistically rely on the individual measured values of communication quality. The threshold values for anomaly determination are often set by an empirical method. Conventional methods of automatically setting appropriate threshold values include adaptive thresholding described in reference 2 "Lucent Technologies, "VitalSQM Service Quality Management Software Brochure", Nov. 5, 2003 [searched May 27, 2005], Internet <URL:http://www.lucent.com/livelink/09009403800552e4_Brochure_datasheet.pdf>".

Adaptive thresholding automatically selects appropriate threshold values on the basis of the quality log in the past, instead of permanently setting threshold values for anomaly determination. To exploit the automatic threshold value selection function, the variation in quality log in the past needs to be moderate to some extent, and each measurement result needs to be statistically equally reliable. If these conditions are not satisfied, an anomaly determination error occurs at high probability.

As a conventional statistical anomaly detection system, "deviation value degree calculation device, probability density estimation device used for the device, and forgetting-type histogram calculation device" is described in reference 3 "Japanese Patent Laid-Open No. 2001-101154". Reference 3 discloses a method of statistically calculating the degree of abnormality of measured data on the basis of the magnitude of a change in probability density distribution obtained by adding the measured data. This method is effective when each measured data has sufficient statistical reliability. However, if data with low statistical reliability exists, an anomaly determination error can occur.

As another conventional anomaly detection system in a communication network, "apparatus for determining communication state in communication network" is disclosed in reference 4 "Japanese Patent Laid-Open No. 10-308824". Reference 4 describes an anomaly determination method for avoiding the following problem. When connection success ratio calculated from the call connection termination count with respect to the call connection request count per unit time is used as a communication quality index, and the call connection request count is small, an anomaly is determined regardless of high objective quality. Anomaly detection of reference 4 is executed in the following way. Assuming connection success ratio in the normal state of the communication network and that in an abnormal state, one-point likelihood is obtained by using a binomial probability expression on the basis of the set of the measured connection request count and the connection success count. When the likelihood of the abnormal model is much higher than that of the normal model, an anomaly is determined. In reference 4, the statistical reliability of a measured value is taken into consideration in anomaly determination. However, it is also necessary to assume the connection success ratio in the abnormal state in principle. Since the communication network normally operates in most time periods, the connection success ratio in the normal state can relatively easily be assumed. However, it is difficult to assume the connection success ratio in the abnormal state. For this reason, as shown in FIGS. 4 and 5 of reference 4, the determination result largely changes depending on setting of a sensitivity parameter $\epsilon$. Hence, sensitivity parameter tuning by an expert is necessary.

DISCLOSURE OF INVENTION

Problems to be Solved by the Invention

As described above, in the conventional anomaly detection system, an anomaly determination error occurs when the statistical reliability of communication quality indices acquired from a communication device is low. Additionally, it is difficult to adjust parameters for determination. In the conventional anomaly detection system, the degree of abnormality corresponding to the statistical reliability of a communication quality index is not quantized, and it is impossible to collectively determine anomaly by referring to a plurality of communication quality indices. Furthermore, the degree of correction control necessary for maintenance corresponding to a detected anomaly is unclear.

It is therefore an object of the present invention to enable to calculate the degree of abnormality on the basis of the measurement result of at least one communication quality index in a communication network in consideration of its statistical reliability.

It is another object of the present invention to execute maintenance corresponding to the degree of abnormality calculated on the basis of the measurement result of at least one communication quality index in a communication network in consideration of its statistical reliability.

It is still another object of the present invention to provide a function of detecting degradation in communication quality for each subscriber on the basis of an index of communication quality measured by a mobile terminal or another communication device and executing maintenance in a communication network having a plurality of subscriber groups with different target values of communication quality to be provided.

Means of Solution to the Problems

According to the present invention, there is provided an anomaly detection method characterized by comprising the steps of obtaining, on the basis of a probability distribution of a communication quality index in a normal operation of a communication network, an upper probability that the communication quality index during a measurement period becomes lower than a measured value, and detecting anomaly of the communication network by using the value of the obtained upper probability.

According to the present invention, there is also provided a maintenance method characterized by comprising the steps of obtaining, on the basis of a probability distribution of a communication quality index in a normal operation of a communication network, an upper probability that the communication quality index during a measurement period becomes lower than a measured value, obtaining a score of a degree of abnormality on the basis of the obtained upper probability, and improving communication quality by changing a network operation parameter related to the communication quality index to generate negative feedback to the score of the degree of abnormality.

According to the present invention, there is also provided an anomaly detection system characterized by comprising storage means for storing a probability distribution of a communication quality index in a normal operation of a communication network, and degree-of-abnormality calculation means for obtaining, on the basis of the probability distribution stored in the storage means, an upper probability that the communication quality index during a measurement period becomes lower than a measured value, and detecting anomaly of the communication network by using the value of the upper probability.

According to the present invention, there is also provided a maintenance system characterized by comprising storage means for storing a probability distribution of a communication quality index in a normal operation of a communication network, and degree-of-abnormality calculation means for obtaining, on the basis of the probability distribution stored in the storage means, an upper probability that the communication quality index during a measurement period becomes lower than a measured value, obtaining a score of a degree of abnormality on the basis of the upper probability, and improving communication quality by changing a network operation parameter related to the communication quality index to generate negative feedback to the score of the degree of abnormality.

Effects of the Invention

According to the present invention, it is possible to calculate the degree of abnormality on the basis of the measurement result of a communication quality index in a mobile communication network in consideration of its statistical reliability and execute maintenance corresponding to the degree of abnormality. According to the present invention, it is also possible to detect degradation in communication quality or a sign of a failure and execute maintenance for each subscriber group on the basis of the index of communication quality measured by a mobile terminal or another communication device in a communication network having a plurality of subscriber groups with different target values of communication quality to be provided.

BRIEF DESCRIPTION OF DRAWINGS

FIG. 3 is a block diagram showing the internal arrangement of a network management apparatus according to the first embodiment of the present invention;

FIG. 4 is a table showing the contents of communication quality statistical information according to the first embodiment of the present invention;

FIG. 5 is a table showing the contents of normal communication quality information according to the first embodiment of the present invention;

FIG. 6 is a flowchart illustrating the operation sequence of a communication quality monitoring process according to the first embodiment of the present invention;

BEST MODE FOR CARRYING OUT THE INVENTION

<Description of Arrangement>

The embodiments of the present invention will be described next in detail with reference to the accompanying drawings.

<First Embodiment>

Figure 1:
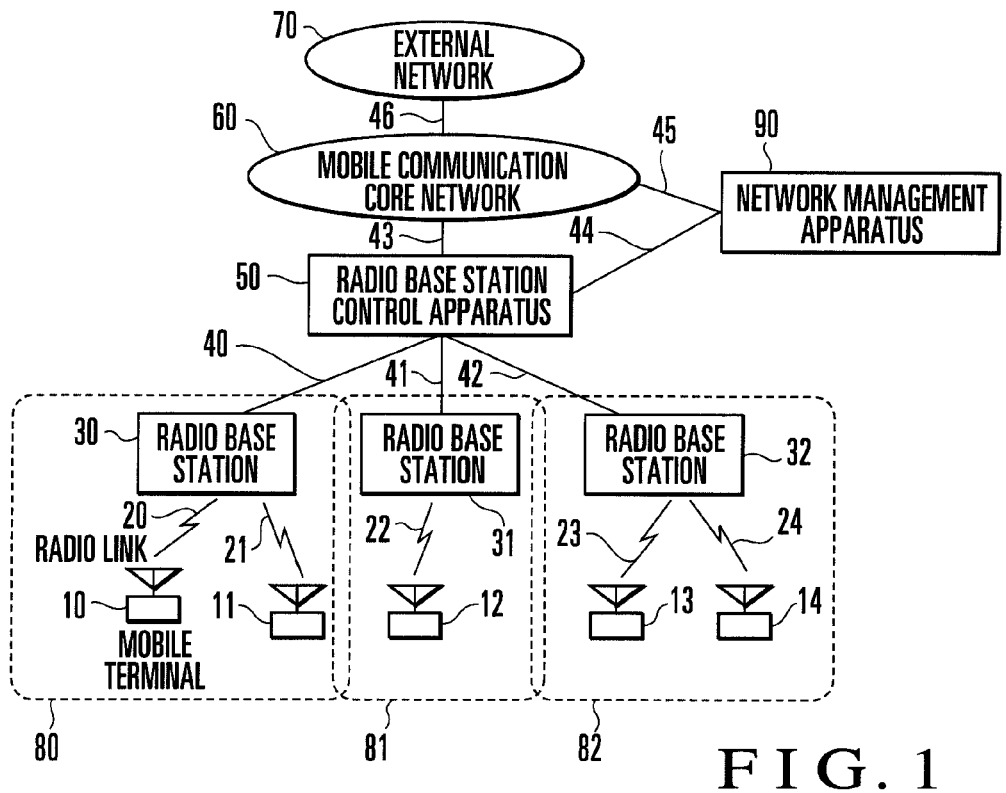
FIG. 1 is a block diagram showing the arrangement of a mobile communication network according to the first embodiment of the present invention.

FIG. 1 shows a mobile communication network according to the first embodiment of the present invention.

Mobile terminals 10 and 11 are connected to a radio base station 30 via radio links 20 and 21. A mobile terminal 12 is connected to a radio base station 31 via a radio link 22. Mobile terminals 13 and 14 are connected to a radio base station 32 via radio links 23 and 24. A radio base station control apparatus 50 transmits/receives communication traffic and control traffic to/from a mobile communication core network 60 via a wired link 43 and to/from the radio base stations 30, 31, and 32 under control via wired links 40, 41, and 42, respectively. A network management apparatus 90 is connected to the radio base station control apparatus 50 and an exchange or server apparatus (not shown) in the mobile communication core network 60 via wired links 44 and 45 and monitors network faults and communication service quality. In a mobile communication network based on 3GPP specifications, the radio base station control apparatus 50 measures the communication quality indices and transmits the result to the network management apparatus 90 periodically, as defined in reference 3 et al. Call reception control and radio resource assignment in communication are done at the time of initial connection of a mobile terminal and in handover between radio cells 80, 81, and 82.

Figure 2:
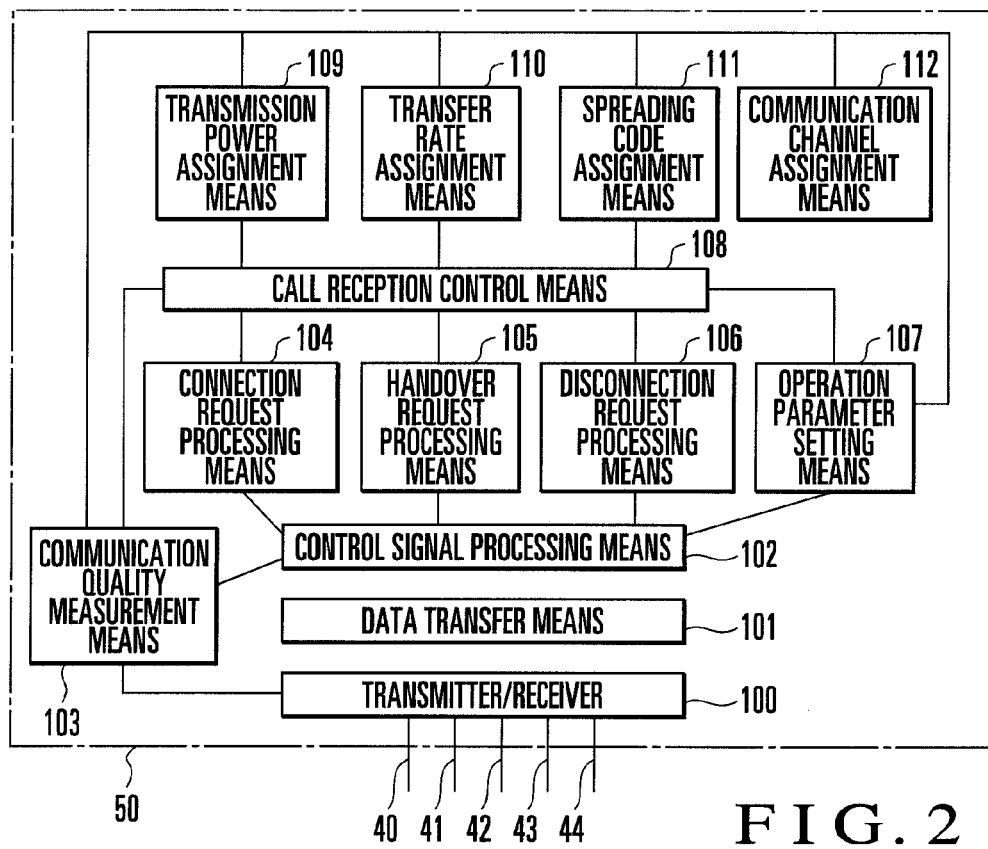
FIG. 2 is a block diagram showing the internal arrangement of a radio base station control apparatus according to the first embodiment of the present invention.

FIG. 2 shows the internal arrangement of the radio base station control apparatus 50. The radio base station control apparatus 50 manages communication resource assignment in the mobile terminals 10 to 14 and radio base stations 30 to 32 under control and executes the connection/disconnection and handover process of the mobile terminals 10 to 14 and the data transfer process with respect to the mobile communication core network 60.

A transmitter/receiver 100 modulates and demodulates signals to be exchanged with the radio base stations 30 to 32 under control, the exchange (not shown) in the mobile communication core network 60, and the network management apparatus 90. A data transfer means 101 transfers a received signal to the destination of the signal. If a control signal whose destination is the radio base station control apparatus 50 is received, the data transfer means 101 outputs it to a control signal processing means 102.

The transmitter/receiver 100 notifies a communication quality measurement means 103 of the communication quality of an uplink radio signal from the mobile terminals 10 to 14 to the radio base stations 30 to 32. As for the communication quality of a downlink from the radio base stations 30 to 32 to the mobile terminals 10 to 14, the communication quality measurement means 103 receives a control signal transmitted from a mobile terminal and outputs it to the communication quality measurement means 103.

Upon receiving a control signal from the mobile terminals 10 to 14, mobile communication core network 60, or network management apparatus 90, the control signal processing means 102 distributes it to a connection request processing means 104, handover request processing means 105, disconnection request processing means 106, or operation parameter setting means 107 in accordance with the type of control signal.

The connection request processing means 104 and handover request processing means 105 receive a calling or terminating connection request or a handover request from the mobile terminals 10 to 14 under control and inquire of a call reception control means 108 whether it is possible to ensure necessary communication resources. If it is possible to ensure communication resources, a transfer rate assignment means 110 determines a communication channel rate in accordance with the type of call and required communication rate. A spreading code assignment means 111 assigns a spreading code in accordance with the required communication rate. A transmission power assignment means 109 assigns transmission power corresponding to the required communication rate and required error rate to the mobile terminal and radio base station. In accordance with these settings, a communication channel assignment means 112 assigns a data transfer channel and control channel. If it is determined by call reception control that no communication resources can be ensured, the connection request processing means 104 and handover request processing means 105 notify the mobile terminals 10 to 14 under control of a connection disable state or handover disable state. When the disconnection request processing means 106 detects an end of communication, the communication resources such as the communication channel, spreading code, and transmission power ensured so far are released.

Upon receiving an operation parameter setting or change instruction from the network management apparatus 90, the operation parameter setting means 107 outputs the contents to the call reception control means 108 if the instruction is to change the setting of the call reception control threshold value. If an instruction to change the transmission power assignment method is received, the operation parameter setting means 107 outputs the contents to the transmission power assignment means 109. If an instruction to change another communication resource assignment method is received, the operation parameter setting means 107 outputs the contents to the transmission power assignment means 109, transfer rate assignment means 110, spreading code assignment means 111, or communication channel assignment means 112 in accordance with the contents of the change.

FIG. 3 shows the internal arrangement of the network management apparatus 90. The network management apparatus 90 executes provisioning of operation parameters (preparation for quick control of operation parameters and actual control of them) of each device in the mobile communication network and monitors network faults and communication service quality.

A radio area design means 207 estimates the quality of each providable communication service on the basis of received topographical information and radio wave propagation conditions of a service target area and outputs optimum operation parameters to an operation parameter setting means 204. Upon receiving network monitor information through a monitor information input means 203, a communication quality monitoring means 205 determines the presence/absence of a network fault. If a fault is detected, the communication quality monitoring means 205 displays the contents of the fault on a fault display means 202. Independently of the presence/absence of network faults, the communication quality monitoring means 205 saves the contents of communication quality monitored every predetermined time in a communication quality statistic storage means (second storage means) 208. Even when notified of fault detection by a degree-of-abnormality calculation means 206, the communication quality monitoring means 205 displays the contents of the fault on the fault display means 202. The degree-of-abnormality calculation means 206 calculates the degree of abnormality of the communication system by using the indices of communication quality measured for each radio cell and the values of communication quality (probability distribution of communication quality indices) in the normal operation, which are held in a normal communication quality storage means (first storage means) 209. If the score of the degree of abnormality is high, the degree-of-abnormality calculation means 206 notifies the communication quality monitoring means 205 of the anomaly and outputs parameters to be corrected to the operation parameter setting means 204 as needed. Examples of the communication quality indices are the connection failure count with respect to the connection request count, the handover failure count with respect to the handover request count, the packet transfer throughput, the packet transfer delay, and the packet loss ratio. These data are measured for each radio cell of the mobile communication network.

FIG. 4 shows the contents of communication quality statistical information 300 held in the communication quality statistic storage means 208. The rows represent acquired statistical items. In this example, a connection request count 301, connection failure count 302, communication normal termination count 303, communication abnormal termination count 304, average transfer delay amount 305, and transfer frame count 306 are defined. The columns in FIG. 4 represent the types of communication services usable by subscribers. A circuit-switched speech communication 320, circuit-switched TV phone 321, circuit-switched data transfer 322, and packet-switched data transfer 323 are defined. In correspondence with each element, the sum or average value of the number of times of occurrence of the event during the monitoring period is recorded.

FIG. 5 shows the contents of normal communication quality information 330 held in the normal communication quality storage means 209. The rows represent the statistical items of communication quality. In this example, a call loss rate 331, communication abnormal termination rate 332, average transfer delay amount 333, and transfer delay amount dispersion 334 are defined. The columns in FIG. 5 correspond to communication services the mobile telecommunications carrier provides to the users. These values can be calculated by taking an average for a long time in the normal operation of the communication network. Except the method using the actual measured values in the normal operation, the guaranteed values of communication quality may be used to guarantee the communication quality for the subscribers. In this case, the alienation between the target communication quality and the actual measurement result is examined.

The arrangement of the first embodiment of the present invention has been described above. The mobile terminals 10 to 14 and radio base stations 30 to 32 in FIG. 1 are well known by those skilled in the art, and a description of the detailed arrangements thereof will be omitted.

<Description of Operation>

FIG. 6 illustrates the operation sequence of a communication quality monitoring process executed by the communication quality monitoring means 205 in the network management apparatus 90. The communication quality monitoring means 205 receives monitor information containing communication service quality data (steps 500 and 501) and determines whether the monitor information contains network fault information (step 502). If fault information is contained, the communication quality monitoring means 205 outputs the fault information to the fault display means 202 (step 503). If no fault information is contained, the process skips step 503. The communication quality monitoring means 205 saves, in the communication quality statistic storage means 208, the communication service quality contained in the monitor information (step 504) and finishes the process (step 505).

A degree-of-abnormality calculation process executed by the degree-of-abnormality calculation means 206 in the network management apparatus 90 will be described next. The degree of abnormality is calculated by referring to the upper probability of a binomial distribution. The statistical reason for this is as follows. Generally, to check whether the ratio of a set of samples is lower than the ratio of the population in a statistical test, a one-sided test using an F-distribution is executed, as described in reference 5 "Shinsuke Muto, "Introduction to Statistical Analysis", Asakura Publishing Co., Ltd, pp. 172-173, 1995".

For example, to test whether a ratio p of failure count f to attempt count a of communication in a measurement period is lower than an average failure ratio $p_0$ of communication in the normal operation, assume $$t=2*(a-f+1), u=2*f \quad (1)$$

Then, $$v=u*(1-p_0)/(t*p_0) \quad (2)$$

is calculated from the F-distribution table. Letting a be the significant level (normally 5% or 1%), $$F^*=f\alpha(t,u) \quad (3)$$

is obtained. When $v<F^*$, the ratio p is regarded to be lower. Actually, this is equivalent to determining whether the upper probability of the binomial distribution is higher than the significant level. Hence, the degree of abnormality of the system can be determined more appropriately by directly using the upper probability value. Using the negative logarithm of the upper probability, the lower the communication quality becomes, the higher the score of the degree of abnormality becomes. Hence, it can appropriately indicate the degree of abnormality or the degree of quality degradation.

The operation of the degree-of-abnormality calculation process executed by the degree-of-abnormality calculation means 206 in the network management apparatus 90 will be described with reference to FIGS. 7 and 8. The average failure ratio of communication attempt (more specifically, call loss rate) will be exemplified as a communication quality index.

Figure 7:
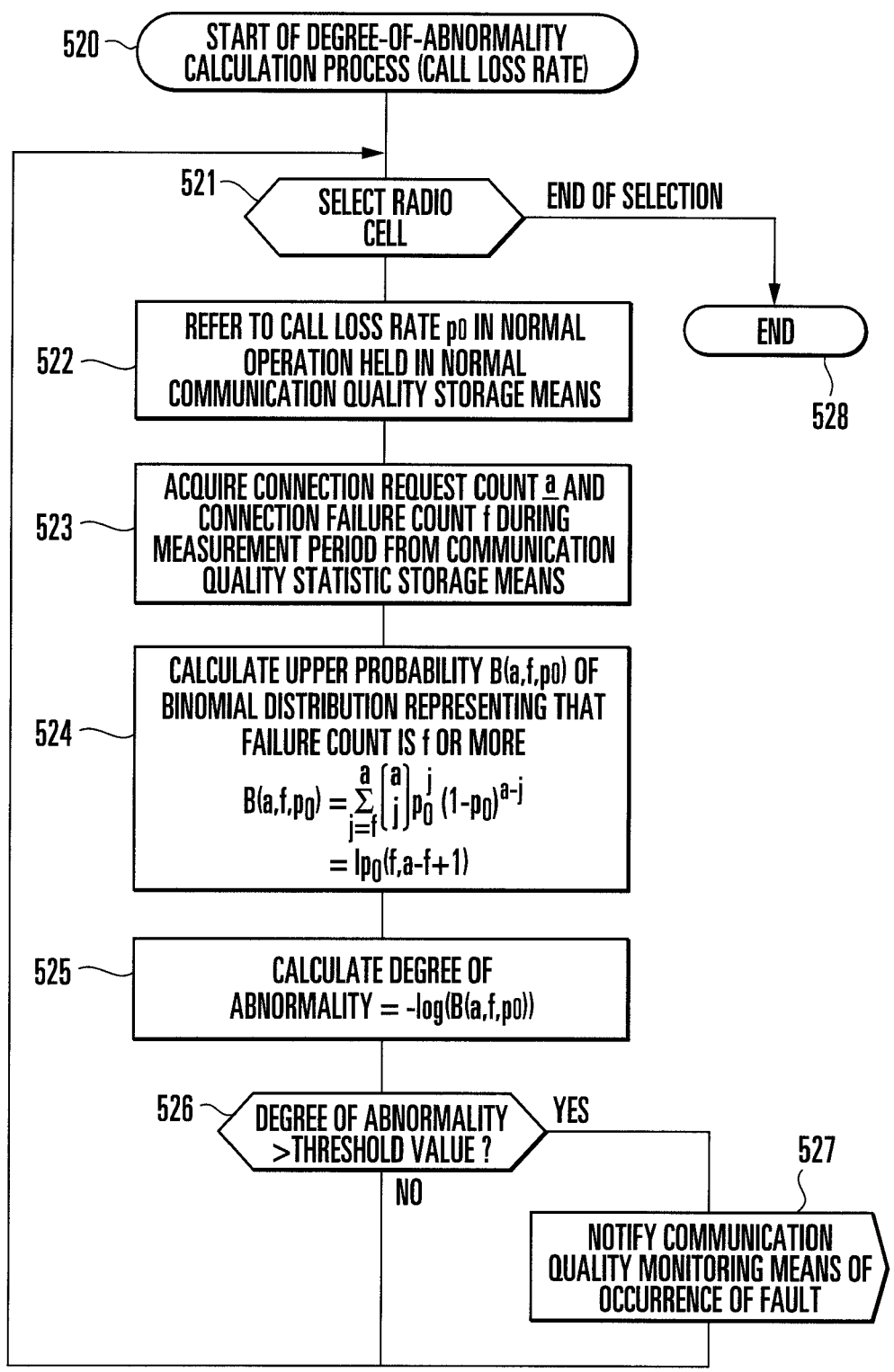
FIG. 7 is a flowchart illustrating the operation sequence of a degree-of-abnormality calculation process of call loss rate according to the first embodiment of the present invention.
Figure 8:
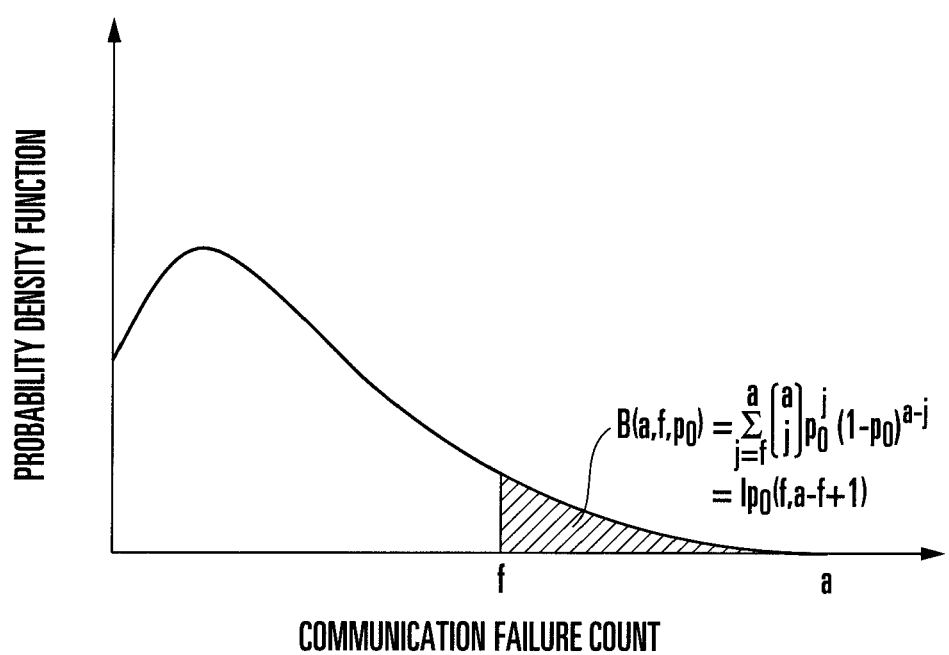
FIG. 8 is a graph for explaining the upper probability in the degree-of-abnormality calculation process according to the first embodiment of the present invention.

Referring to FIG. 7, the degree-of-abnormality calculation means 206 calculates the degree of abnormality of each radio cell upon receiving a request from the communication quality monitoring means 205 or every predetermined period (step 520). First, the degree-of-abnormality calculation means 206 selects a radio cell to be subjected to degree-of-abnormality calculation (step 521). The call loss rate $p_0$ in the normal operation, which is stored in the normal communication quality storage means 209, is referred to (step 522). The connection request count a and connection failure count f during the measurement period are acquired from the communication quality statistic storage means 208 (step 523). In, e.g., the circuit-switched speech communication service, $p_0=0.02$, as shown in FIG. 5, and a=60, and f=2, as shown in FIG. 4. The upper probability of the binomial distribution representing that the connection failure count is f or more is indicated by the hatched area in FIG. 8, which is calculated by $$B(a, f, p_0) = \sum_{j=f}^{a} \binom{a}{j} p_0^j (1-p_0)^{a-j} \quad (1)$$

$$= fp_0(f, a-f+1)$$

where $Ip_0(f, a-f+1)$ is an incomplete beta function (step 524). The degree of abnormality of communication quality is obtained as negative logarithm $-\log(B(a,f,p_0))$ of the thus obtained upper probability (step 525). The shape of the probability density function of the binomial distribution changes depending on the number of samples (number of times of communication attempt). Even when the measurement result indicates the same call loss rate, the degree of abnormality tends to be higher when the number of times of communication attempt is large. Hence, the score of the degree of abnormality is obtained in consideration of the statistical reliability of the measurement result. If the degree of abnormality exceeds a predetermined threshold value (step 526), the degree-of-abnormality calculation means 206 notifies the communication quality monitoring means 205 of occurrence of a fault (step 527) and starts calculating the degree of abnormality of the next radio cell. When degree-of-abnormality calculation is ended for all radio cells, the process is ended (step 528).

As described above, when the upper probability of the binomial distribution is used, anomaly can be detected in consideration of the statistical reliability of the measurement result.

Figure 9:
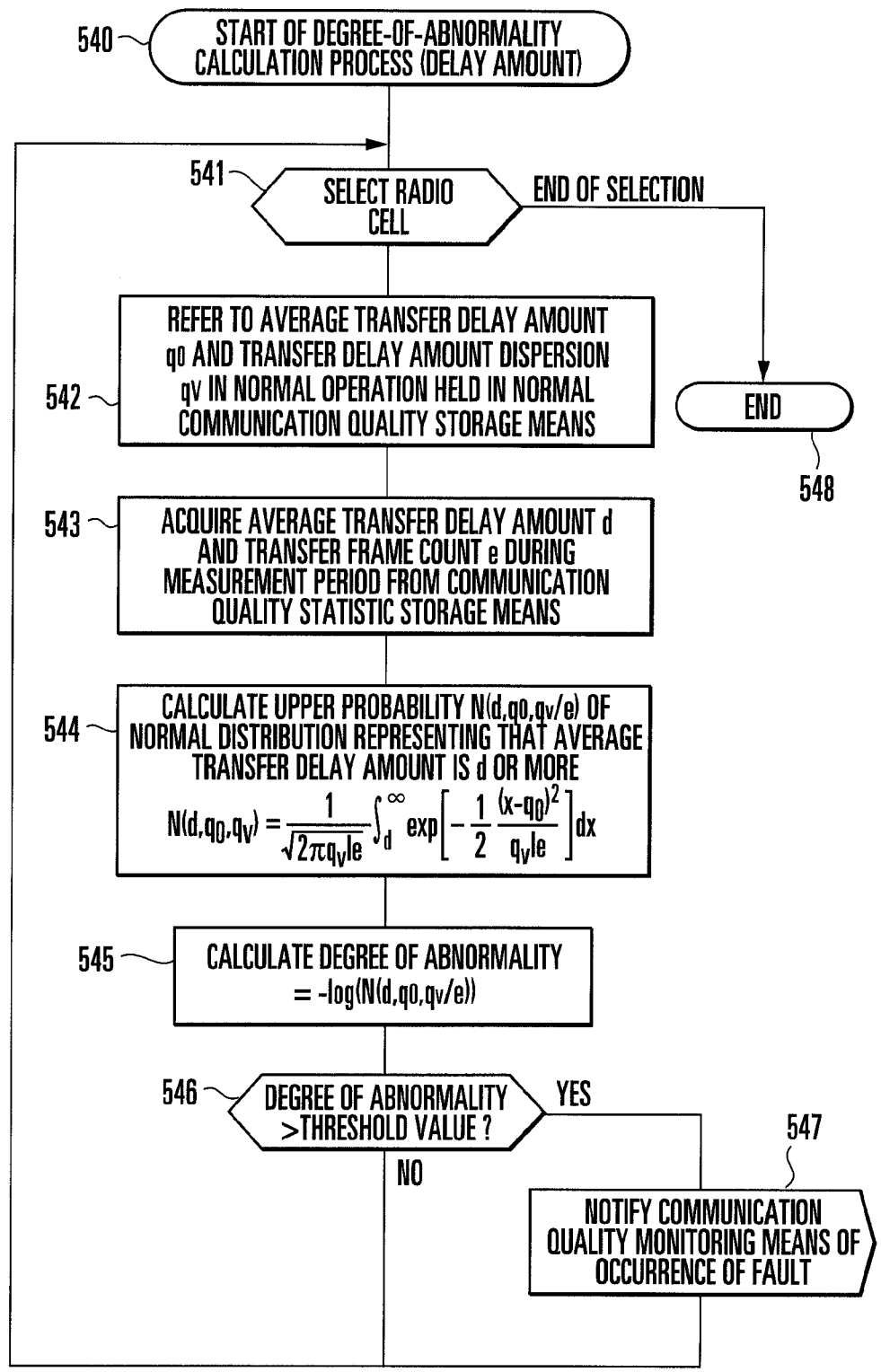
FIG. 9 is a flowchart illustrating the operation sequence of a degree-of-abnormality calculation process of average transfer delay amount according to the first embodiment of the present invention.

FIG. 9 illustrates the operation sequence in calculating the degree of abnormality for not a ratio but continuous values like the average transfer delay amount. In this case, the average transfer delay amount of frames in a packet-switched service is used as a communication quality index. The degree-of-abnormality calculation means 206 selects a radio cell to be subjected to degree-of-abnormality calculation (steps 540 and 541). An average transfer delay amount $q_0$ and transfer delay amount dispersion $q_v$ in the normal operation, which are stored in the normal communication quality storage means 209, are referred to (step 542). An average transfer delay amount d and transfer frame count e during the measurement period are acquired from the communication quality statistic storage means 208 (step 543). In, e.g., the packet-switched data transfer service, $q_0=200$ ms, and $q_v=40$ ms, as shown in FIG. 5, and d=240 ms, and $e=1.2*10^5$, as shown in FIG. 4. The upper probability of the normal distribution representing that the average transfer delay amount is d or more is given by $$N(d, q_0, q_v) = \frac{1}{\sqrt{2\pi q_v/e}} \int_d^\infty \exp\left[-\frac{1}{2}\frac{(x-q_0)^2}{q_v/e}\right]dx \quad (2)$$

This can be calculated by using an incomplete gamma function (step 544).

The degree of abnormality of communication quality is obtained as negative logarithm $-\log(N(d,q_0,q_v/e))$ of the thus obtained upper probability (step 545). Even when the average transfer delay does not change, the degree of abnormality becomes higher as the number of transfer frames in the measurement period increases. Hence, the score of the degree of abnormality is obtained in consideration of the statistical reliability of the measurement result. If the degree of abnormality exceeds a predetermined threshold value (step 546), the degree-of-abnormality calculation means 206 notifies the communication quality monitoring means 205 of occurrence of a fault (step 547) and starts calculating the degree of abnormality of the next radio cell. When degree-of-abnormality calculation is ended for all radio cells, the process is ended (step 548).

As described above, when the upper probability of the normal distribution is used, anomaly can be detected in consideration of the statistical reliability of the measurement result.

The binomial distribution becomes closer to the normal distribution when the number of samples is sufficiently large, and the average ratio $p_0$ is much smaller than 1, as is known. The upper probability can be more easily calculated in the normal distribution. Even when a statistic such as a transfer delay amount that cannot be modeled by a binomial distribution is used as a communication quality index, anomaly can effectively be detected on the basis of the upper probability of a normal distribution. The reason why the dispersion value $q_v$ is divided by e in obtaining the upper probability is as follows. When e samples are extracted from the population of a normal distribution of the average value $q_0$ and dispersion $q_v$ at random, the random variable of the average value of the samples complies with the normal distribution of the average value $q_0$ and dispersion $q_v/e$.

<Second Embodiment>

Figure 10:
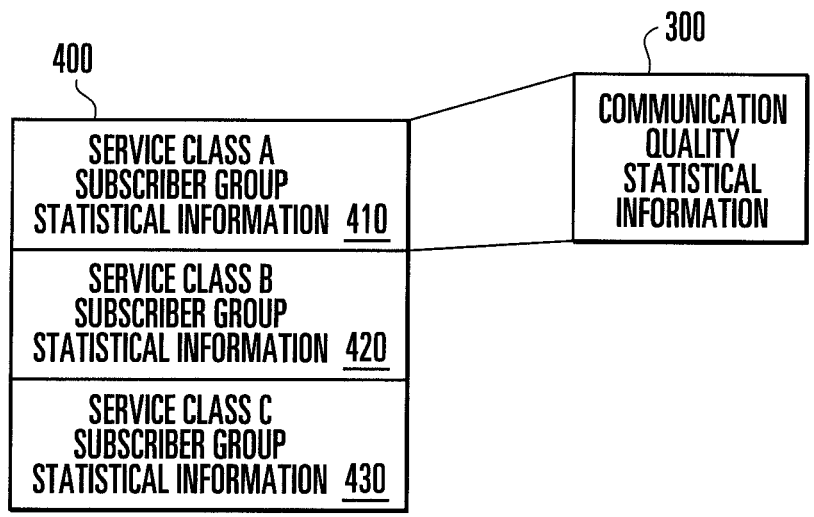
FIG. 10 is a view showing the contents of subscriber group specific communication quality statistical information according to the second embodiment of the present invention.
Figure 11:
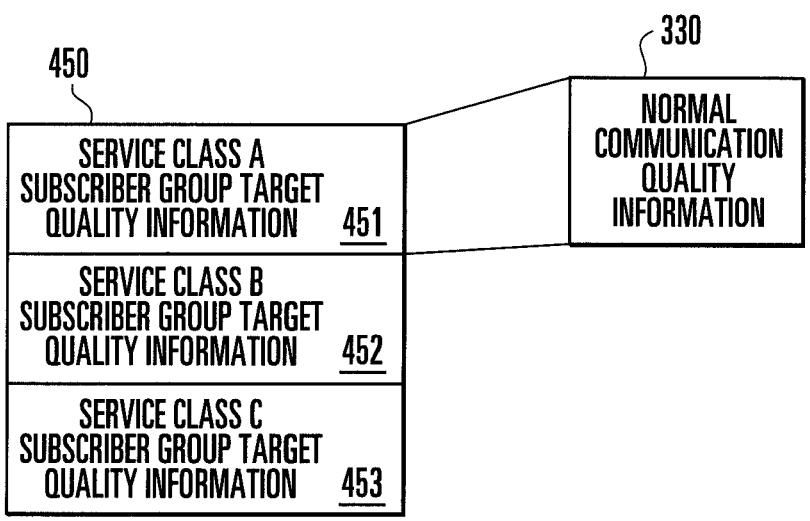
FIG. 11 is a view showing the contents of subscriber group specific target communication quality information according to the second embodiment of the present invention.

The second embodiment of the present invention employs the same basic arrangement as described above, which is usable to detect degradation in communication quality of each subscriber group in a communication network having a plurality of subscriber groups with different target values of communication quality to be provided. FIG. 10 shows subscriber group specific communication quality statistical information 400 held in a communication quality statistic storage means 208 according to the second embodiment of the present invention. Three target valves of communication quality to be provided are set to service classes A, B, and C. A communication quality monitoring means 205 acquires pieces of statistical information 410, 420, and 430 corresponding to subscriber groups who have singed up in the service classes (steps 501 to 504 in FIG. 6). The format of the statistical information is the same as that of the communication quality statistical information 300 in the first embodiment. A normal communication quality storage means 209 holds subscriber group specific target communication quality information 450 corresponding to each service class, as shown in FIG. 11. The contents of subscriber group specific target quality information 451, 452, and 453 are the same as those of the normal communication quality information 330 in the first embodiment. A degree-of-abnormality calculation means 206 calculates abnormality for communication quality of each subscriber group by using these pieces of information (steps 521 to 525 in FIG. 7 and steps 541 to 545 in FIG. 9), thereby detecting quality degradation for the subscribers (steps 526 to 528 in FIG. 7 and steps 546 to 548 in FIG. 9).

<Third Embodiment>

Figure 12:
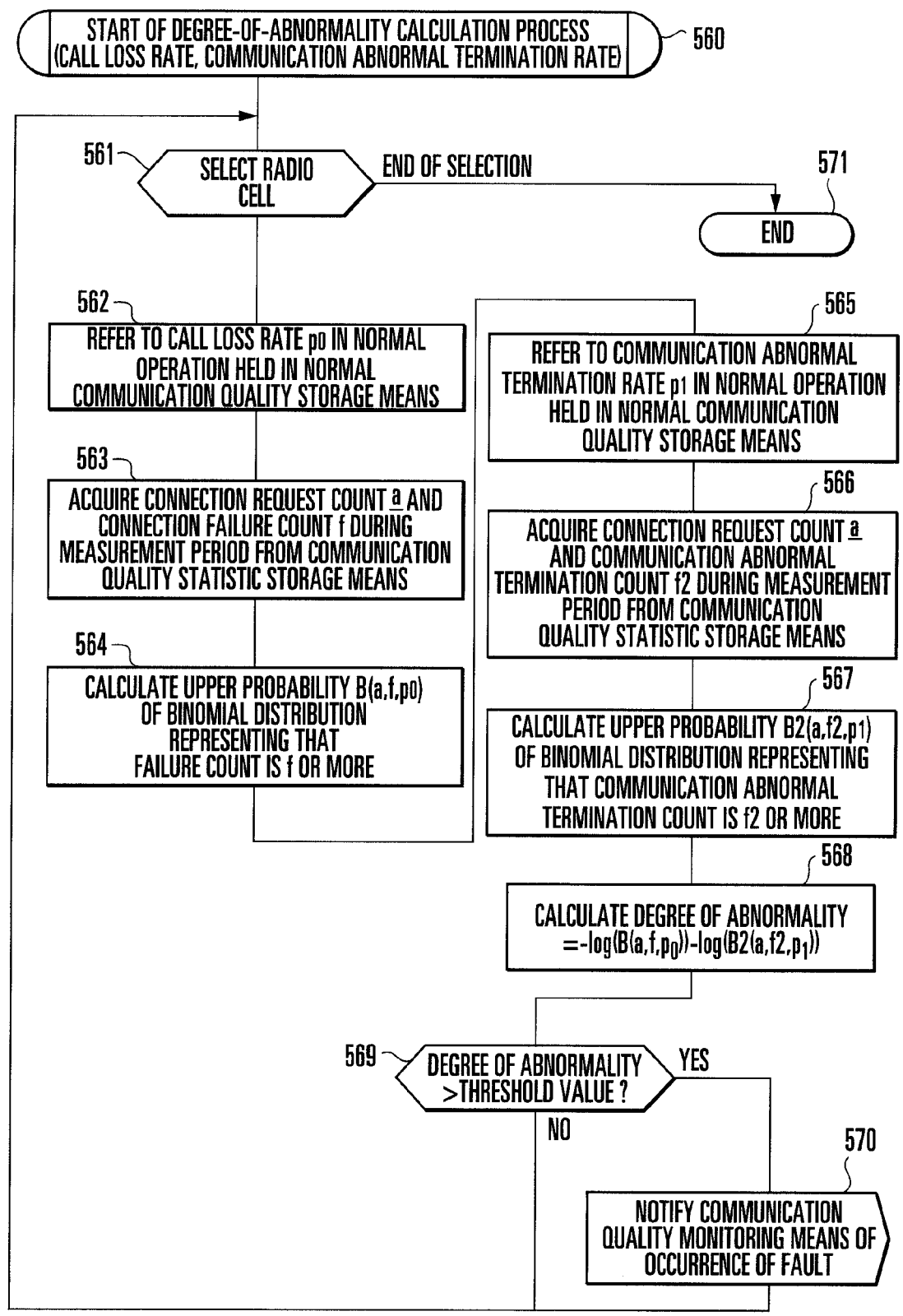
FIG. 12 is a flowchart illustrating the operation sequence of a degree-of-abnormality calculation process according to the third embodiment of the present invention.

FIG. 12 illustrates the operation sequence of a degree-of-abnormality calculation means 206 in detecting anomaly in a communication network by weighted addition of a degree of abnormality to a plurality of communication quality indices according to the third embodiment of the present invention.

In FIG. 12, the same weight of the degree of abnormality is set for two communication quality indices: call loss rate and abnormal termination rate. Steps 560 to 564 in FIG. 12 are the same as steps 520 to 524 in FIG. 7 in the first embodiment. In the third embodiment, a communication abnormal termination rate $p_1$ in the normal operation, which is stored in a normal communication quality storage means 209, is referred to (step 565). A connection request count a and communication abnormal termination count f2 during the measurement period are acquired from a communication quality statistic storage means 208 (step 566). On the basis of them, the degree-of-abnormality calculation means 206 calculates an upper probability $B2(a,f2,p_1)$ of the binomial distribution representing that the communication abnormal termination count is f2 or more (step 567). The degree of abnormality is calculated by adding the score $-\log(B(a,f,p_0))$ of the degree of abnormality of the call loss rate and the score $-\log(B(a,f2,p_1))$ of the degree of abnormality of the abnormal termination rate (step 568). If the degree of abnormality exceeds a predetermined threshold value (step 569), the degree-of-abnormality calculation means 206 notifies a communication quality monitoring means 205 of occurrence of a fault (step 570) and starts calculating the degree of abnormality of the next radio cell. When degree-of-abnormality calculation is ended for all radio cells, the process is ended (step 571).

As described above, when the degree of abnormality is calculated on the basis of a plurality of communication quality indices, anomaly in the communication network can be detected collectively at high reliability.

<Fourth Embodiment>

Figure 13:
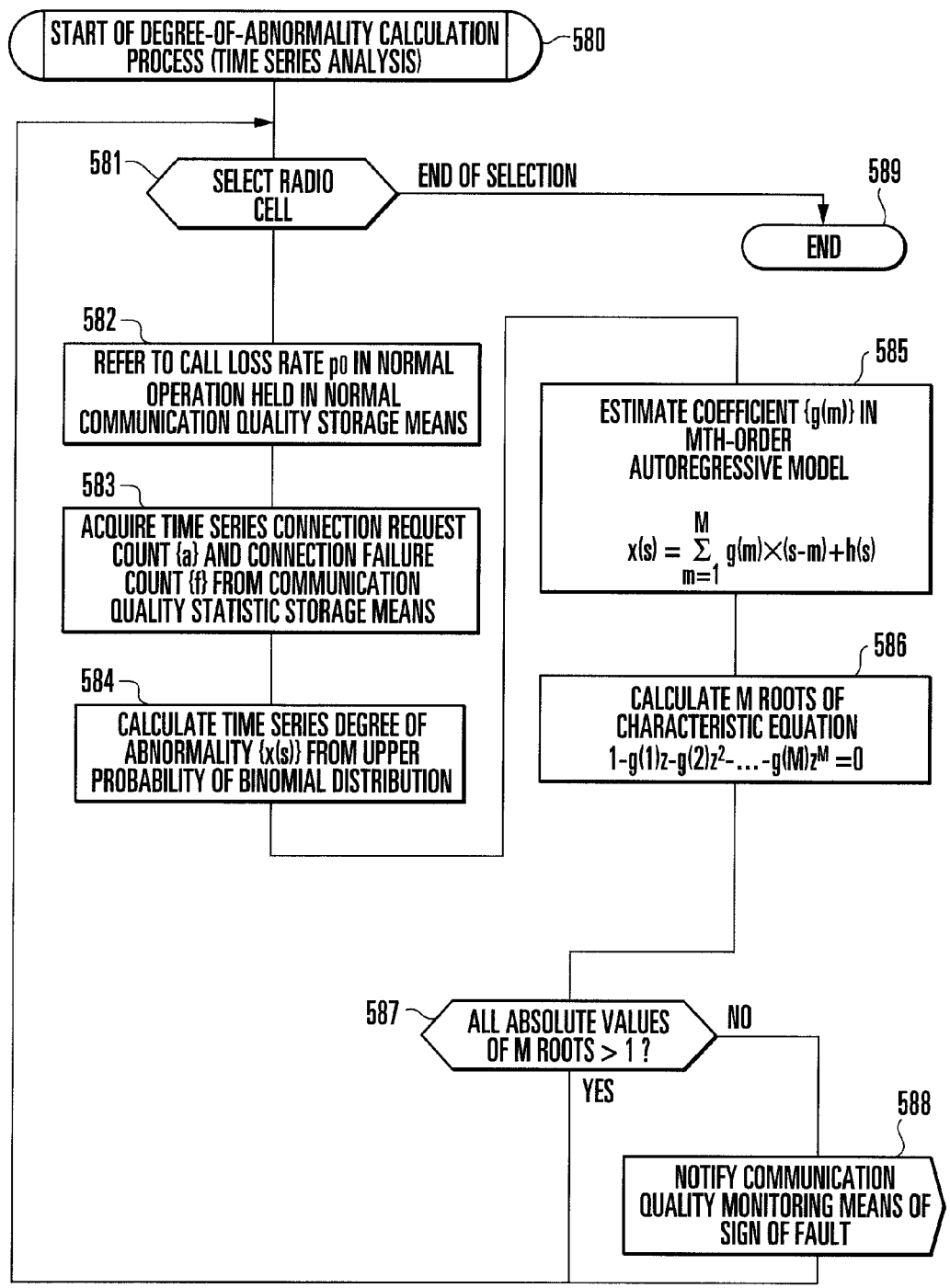
FIG. 13 is a flowchart illustrating the operation sequence of a degree-of-abnormality calculation process according to the fourth embodiment of the present invention.

FIG. 13 illustrates the operation sequence of a degree-of-abnormality calculation means 206 according to the fourth embodiment of the present invention. In the fourth embodiment, a sign of anomaly in a communication system is detected by time series analysis. The sign of anomaly can be detected when communication quality indices largely fluctuate from the steady state.

As described above in the first embodiment, a communication quality monitoring means 205 stores, in a communication quality statistic storage means 208, an index of communication quality, i.e., call loss rate measured a plurality of number of times every predetermined time. The degree-of-abnormality calculation means 206 calculates the degree of abnormality by using the upper probability of a binomial distribution on the basis of the measurement result of call loss rate, as in the first embodiment, thereby acquiring a sequence $\{x(s)\}$ the time series degree of abnormality (steps 580 to 584). The time series degree of abnormality is applied to an Mth-order autoregressive model, and a coefficient $\{g(m)\}$ is estimated by using, e.g., the Burg method (step 585). It is checked for the thus estimated coefficient $\{g(m)\}$ whether all the absolute values of M roots of the characteristic equation are larger than 1 (steps 586 and 587). If the steady condition is not satisfied, the degree-of-abnormality calculation means 206 notifies the communication quality monitoring means 205 of occurrence of a sign of a fault (step 588). When time series analysis is ended for all radio cells, the process is ended (step 589).

As described above, a sign of a fault can be detected by applying the time series degree of abnormality to the autoregressive model and checking whether it does not satisfy the steady condition.

The autoregressive model is a method used as a standard in the field of time series analysis and prediction and described in reference 6 ""Method of Time Series Analysis" edited by Tohru Ozaki and Genshiro Kitagawa, Asakura Publishing Co., Ltd, pp. 61-71, 1998". The time series $\{x(s)\}$ of the score of the degree of abnormality is expressed by using an autoregressive model as $$x(s) = \sum_{m=1}^{M} g(m) \times (s - m) + h(s) \qquad (3)$$

where g(m) is the coefficient, and h(s) is the prediction error.

As the method of estimating the coefficient of the autoregressive model, the Burg method, Yule-Walker method, and least squares method are known. An appropriate method is usable in accordance with the characteristic of the time series. From the estimated coefficient $\{g(m)\}$ and the time series $\{x(s)\}$ of the score of the degree of abnormality calculated on the basis of measurement of M times, the predicted value of the degree of abnormality at the next measurement time is given by $$\hat{x}(s) = \sum_{m=1}^{M} g(m) \times (s - m) \qquad (4)$$

to make x(s) converge to 0 under the steady condition of the autoregressive model, i.e., at the limit where the time is infinite, all the absolute values of M roots of the characteristic equation given by $$1 - g(1)z - g(2)z^2 - \ldots - g(M)z^M = 0 \qquad (5)$$

must be larger than 1.

If the steady condition is not satisfied, it indicates that a sign of considerable variation in communication quality is detected. Hence, maintenance is necessary.

The method itself of detecting anomaly on the basis of the unsatisfied steady condition of an autoregressive model is known in, e.g., reference 7 "Cynthia S. Hood, Chuanyi Ji, "Proactive Network-Fault Detection", IEEE Transactions on Reliability, Vol. 46, No. 3, pp. 333-341, September 1997". The characteristic features of this embodiment are that the degree of abnormality is calculated on the basis of the upper probability, and the maintenance operation is executed in accordance with the score of the degree of abnormality.

<Fifth Embodiment>

Figure 14:
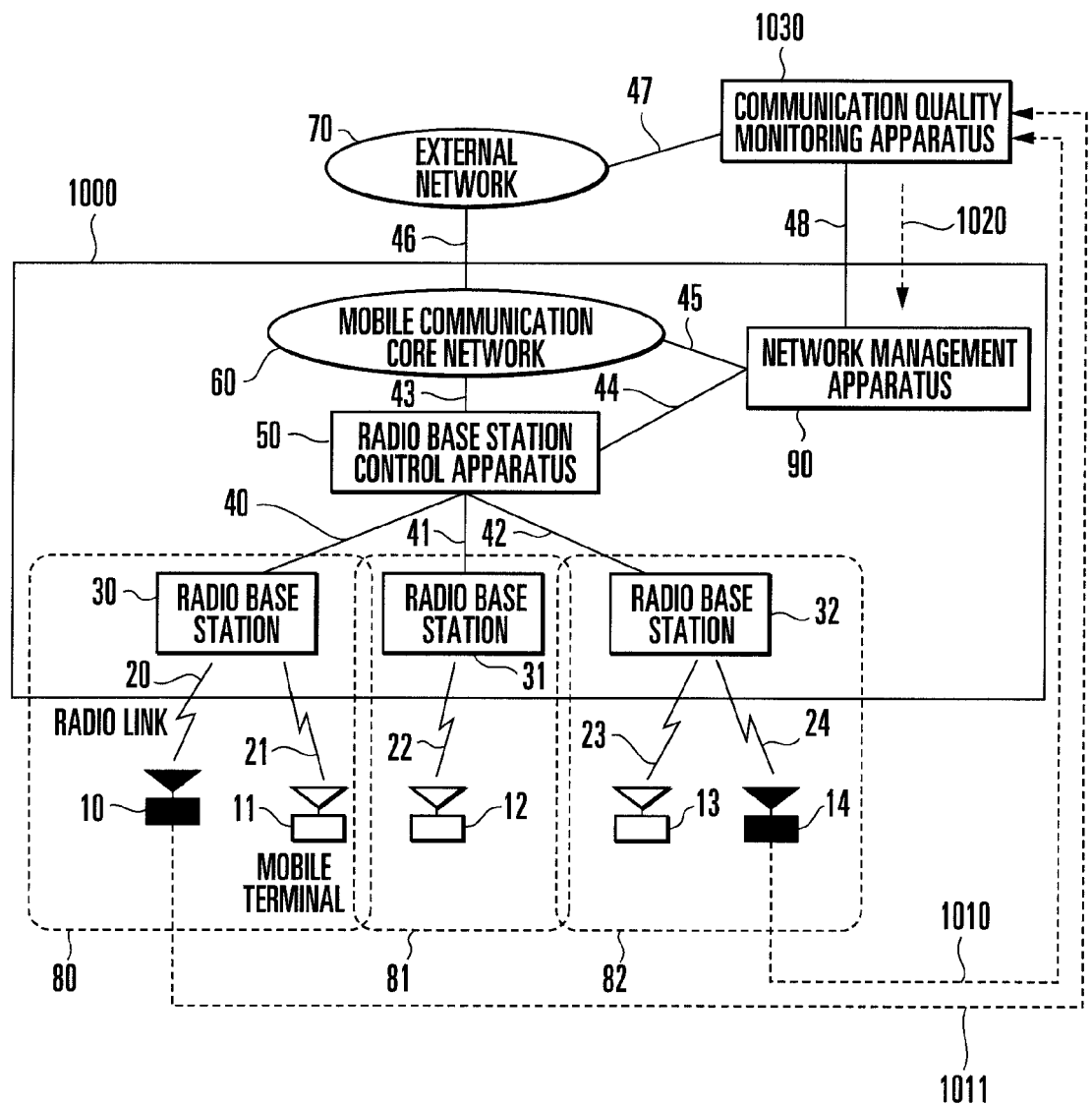
FIG. 14 is a block diagram showing the arrangement of a mobile communication network and a communication quality monitoring apparatus according to the fifth embodiment of the present invention.

In the first to fourth embodiments, the telecommunications carrier measures and analyzes the communication quality indices. However, a subscriber or an external carrier can also execute the measurement and analysis. At this time, the telecommunications carrier commissions the external carrier to conduct the service quality monitoring operation. FIG. 14 shows the arrangement of a mobile communication network and a communication quality monitoring apparatus according to the fifth embodiment of the present invention. Referring to FIG. 14, reference numeral 1000 denotes a mobile communication network.

Mobile terminals 10 to 14 generate communication quality monitoring results 1010 and 1011 and periodically transmit them to a communication quality monitoring apparatus 1030 serving as a server for managing communication quality. The external carrier causes the communication quality monitoring apparatus 1030 to collect the communication quality monitoring results 1010 and 1011 sent from the mobile terminals 10 to 14 and executes detection and analysis of anomaly. Information contained in the communication quality monitoring results 1010 and 1011 is the same as the communication quality statistical information 300 in FIG. 4 which is acquired for each radio cell in the first embodiment. In the fifth embodiment, the information is statistical information of each mobile terminal. In the first to fourth embodiments, it is difficult to measure communication quality for each subscriber because the traffic exchange performance of the network management apparatus 90 can degrade due to an increase in load of the quality monitoring process. In the fifth embodiment, however, it is possible to monitor communication quality for each subscriber because the mobile terminals 10 to 14 directly send the quality monitoring result to the communication quality monitoring apparatus 1030 of the external carrier.

The communication quality monitoring apparatus 1030 comprises the same means as the communication quality monitoring means 205, degree-of-abnormality calculation means 206, communication quality statistic storage means 208, and normal communication quality storage means 209 in the network management apparatus 90 of the first embodiment shown in FIG. 3, and a transmitter/receiver to receive the communication quality monitoring results 1010 and 1011 from the mobile terminals 10 to 14 and transmit communication quality degradation terminal information 1020 to a network management apparatus 90. The communication quality monitoring apparatus 1030 calculates the degree of abnormality of measured communication quality, thereby detecting degradation in communication quality of each terminal. The communication quality monitoring apparatus 1030 sends, to the network management apparatus 90, the information of a terminal in which degradation in communication quality is detected as the communication quality degradation terminal information 1020. Upon receiving the communication quality degradation terminal information 1020, the network management apparatus 90 of the telecommunications carrier executes maintenance control to recover the communication quality. Note that the communication quality monitoring apparatus 1030 may totalize the measurement result of a communication quality index for subscriber groups with the same target value of communication quality to be provided, obtain the score of the degree of abnormality on the basis of the upper probability that the communication quality index during the measurement period becomes lower than the measured value, and detect degradation in communication quality for each subscriber group in accordance with the score of the degree of abnormality.

Instead of only notifying the telecommunications carrier of the terminal requiring maintenance, the communication quality monitoring apparatus 1030 of the external carrier may periodically send the monitoring result to the network management apparatus 90, the terminal (not shown) of the telecommunications carrier and the mobile terminals 10 to 14, or a subscriber terminal (not shown) even when no anomaly is detected. For example, when the telecommunications carrier makes a contract of guarantee related to communication quality of every month with a subscriber group of a legal person, the communication quality monitoring apparatus 1030 or the terminal (not shown) of the telecommunications carrier totalizes the monitoring results of the subscriber group belonging to the same legal person, summarizes the presence/absence of anomaly in the current month and the result of comparison with communication quality to be guaranteed, and sends the summary to the terminal of the telecommunications carrier and the terminals of the subscribers. As described above, when the communication quality monitoring apparatus 1030 of the external carrier collects quality monitoring results from the mobile terminals and analyzes the degree of abnormality, communication quality anomaly detection and maintenance control can be executed for each subscriber without changing the network configuration of the mobile telecommunications carrier (without putting a load on the radio base stations). Alternatively, the communication quality monitoring apparatus 1030 of the external carrier may also analyze the communication quality indices collected from the network device such as the radio base station control apparatus 50 held by the telecommunications carrier, as in the first to fourth embodiments. This allows the telecommunications carrier and the subscribers to mutually monitor the communication quality.

<Sixth Embodiment>

When anomaly in communication quality is detected, maintenance may be executed to generate negative feedback, i.e., reduce the degree of abnormality in accordance with its score. In the sixth embodiment of the present invention, the call reception control threshold value is corrected in accordance with the score of the degree of abnormality. Other network operation parameters as the target of maintenance corresponding to the degree of abnormality are the pilot channel transmission power of a radio base station, the outer loop transmission power of downlink data transmitted from a radio base station to a mobile terminal, the outer loop transmission power of uplink data transmitted from a mobile terminal to a radio base station, a radio link addition threshold value reception power referred to by a mobile terminal in handover, a radio link deletion threshold value reception power, and a radio link replacement threshold value reception power.

Figure 15:
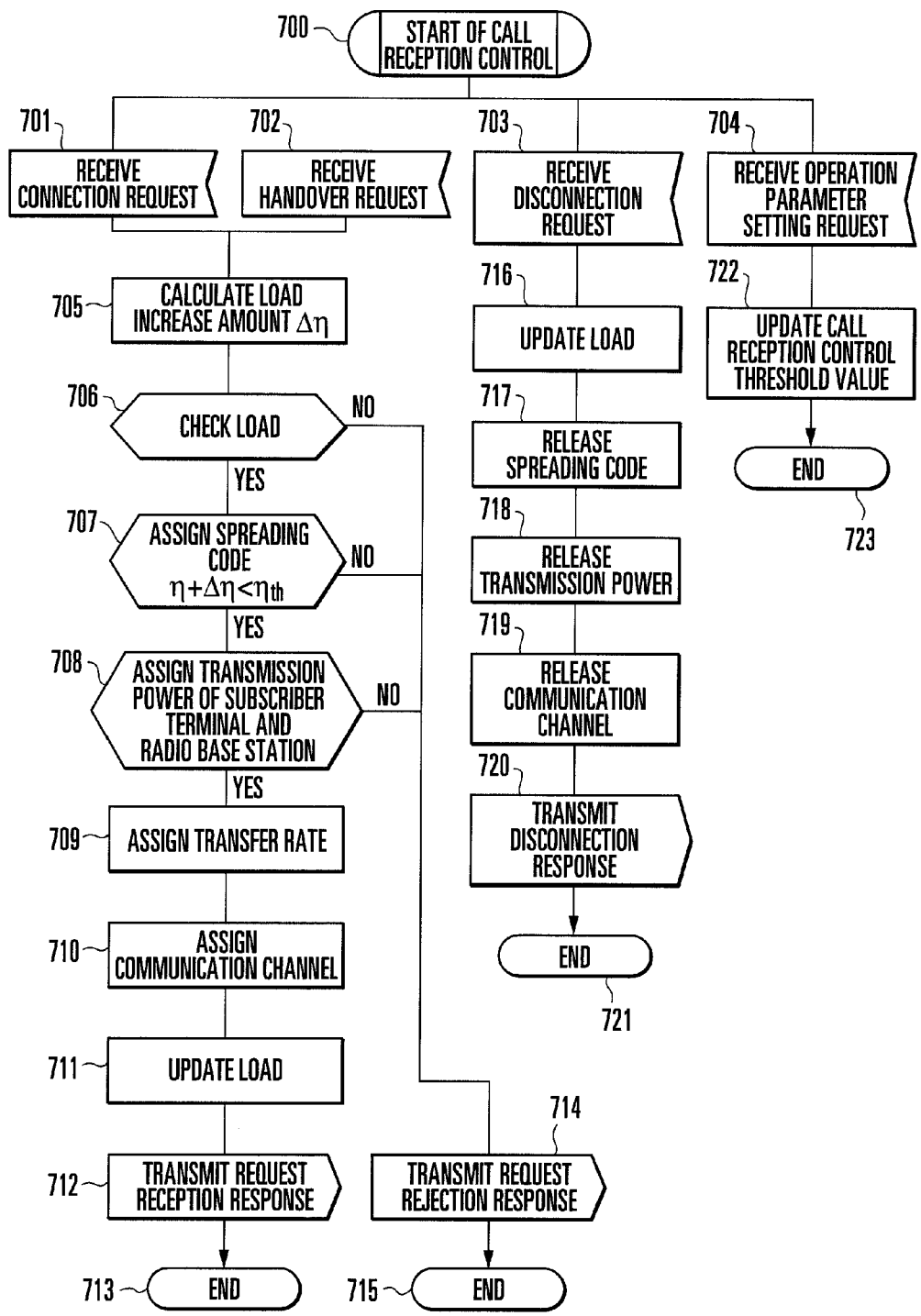
FIG. 15 is a flowchart illustrating the operation sequence of a call reception control process according to the sixth embodiment of the present invention.

FIG. 15 illustrates the operation sequence of a call reception control process executed by a radio base station control apparatus 50 according to the sixth embodiment of the present invention. Upon receiving a calling or terminating connection request or a handover request for mobile terminals 10 to 14 (steps 700, 701, and 702), the radio base station control apparatus 50 calculates a load increase amount $\Delta\eta$ generated upon call reception on the basis of, e.g., the type of call, communication rate, and required frame error rate (step 705). Normally, this load calculation and reception control are done independently in uplink and downlink. It is checked on the basis of the load increase amount whether the load will exceed an upper limit value $\eta_{th}$ when a call is received at a current load value $\eta$ (step 706). Without any problem, a spreading code, transmission power, communication channel transfer rate, and communication channel are assigned (steps 707 to 710). After the load is updated (step 711), a connection or handover request reception response is transmitted (step 712), and the process is ended (step 713). If a problem is posed in any one of steps 706 to 708, a connection or handover request rejection response is generated and transmitted (step 714), and the process is ended (step 715).

Upon receiving a disconnection request (step 703), the load is updated (step 716). Various kinds of communication resources including the spreading code, transmission power, and communication channel are released (steps 717 to 719). A disconnection response is transmitted (step 720), and the process is ended (step 721).

Upon receiving an operation parameter setting request (step 704), the threshold value is updated (step 722) if the request instructs to change the threshold value ($\eta_{th}$) of call reception control, and the process is ended (step 723). As is apparent from FIG. 15, the higher the threshold value $\eta_{th}$ of call reception control is, the smaller the call loss or abnormal termination due to a shortage of resources becomes. However, if the threshold value is too high, the power control margin of radio channel cannot be ensured, and the system becomes unstable. For this reason, the threshold value is preferably adjusted exclusively only when the resources are insufficient.

Figure 16:
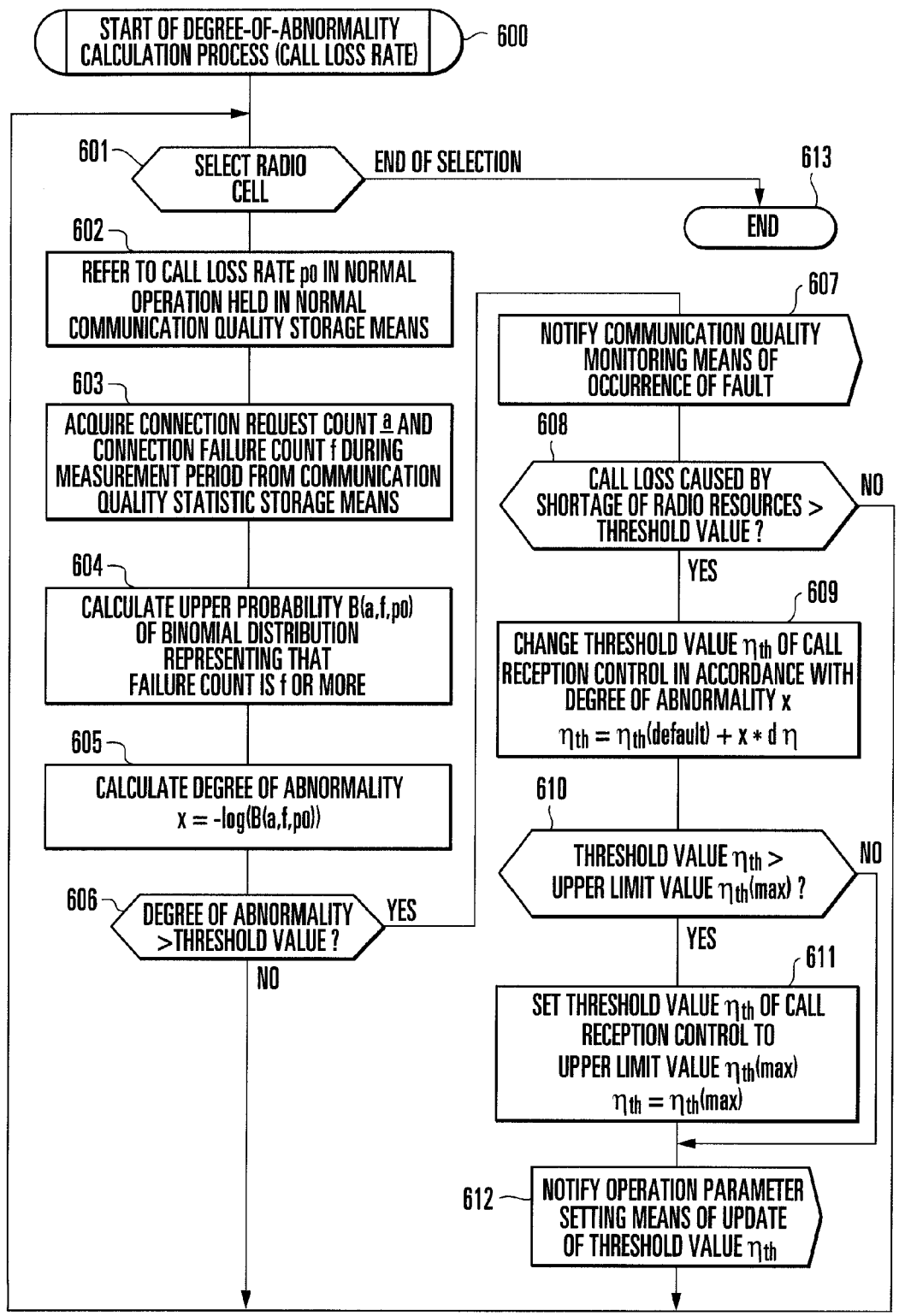
FIG. 16 is a flowchart illustrating the operation sequence of a degree-of-abnormality calculation process according to the sixth embodiment of the present invention.

FIG. 16 illustrates the operation sequence of a degree-of-abnormality calculation means 206 according to the sixth embodiment of the present invention. The process of calculating the degree of abnormality on the basis of the call loss rate and measured value in the normal operation and, upon detecting anomaly, notifying a communication quality monitoring means 205 of occurrence of a fault (steps 600 to 607) is the same as in the first embodiment. In the sixth embodiment, when anomaly is detected, and the main cause of the anomaly is recognized as call loss caused by a shortage of radio resources (step 608), the threshold value $\eta_{th}$ of call reception control is increased almost in proportion to the degree of abnormality x (step 609). That is, the threshold value $\eta_{th}$ is changed to generate negative feedback to the degree of abnormality x. If the threshold value exceeds the upper limit by the process in step 609 (step 610), the threshold value is set to an upper limit value $\eta_{th}(\max)$ (step 611). When the threshold value is updated, a notification is sent to an operation parameter setting means 204 (step 612). When anomaly detection and threshold value updating are ended for all radio cells, the process is ended (step 613).

As described above, when the call reception control threshold value is corrected in accordance with the score of the degree of abnormality, maintenance control for a communication fault can appropriately be done. In the above-described example, the process in steps 608 to 612 is added to the first embodiment of the present invention. However, the process in steps 608 to 612 may be added to the second to fifth embodiments, as a matter of course. When the process is added to the fourth embodiment, the score of the degree of abnormality at the next measurement time is predicted by using the coefficient $\{g(m)\}$ estimated in step 585. A network operation parameter is changed to generate negative feedback to the score of the degree of abnormality by using the predicted value of the score of the degree of abnormality.

In the present invention, the anomaly detection method and maintenance control using the upper probability that an index related to communication becomes lower than a measured value have been described. It is easy for those skilled in the art to replace the above method with another method of measuring the degree of abnormality and, for example, a method using a one-point probability that an index matches a measured value. However, the one-point probability is the probability density itself. The upper probability is the integrated value of the probability density and is therefore usable to detect anomaly independently of the shape of the probability distribution.

Figure 17A:
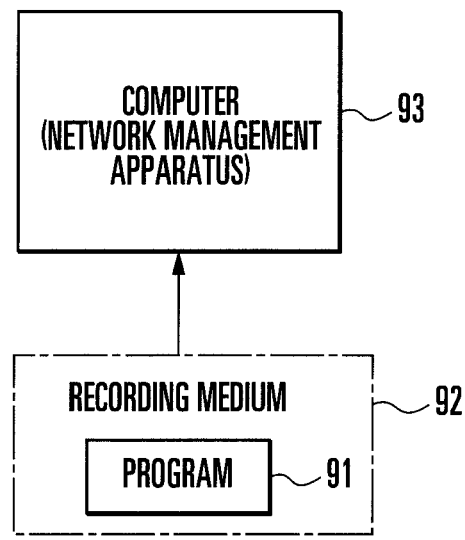
FIG. 17A is a view for explaining a network management apparatus implemented by a computer and a program.
Figure 17B:
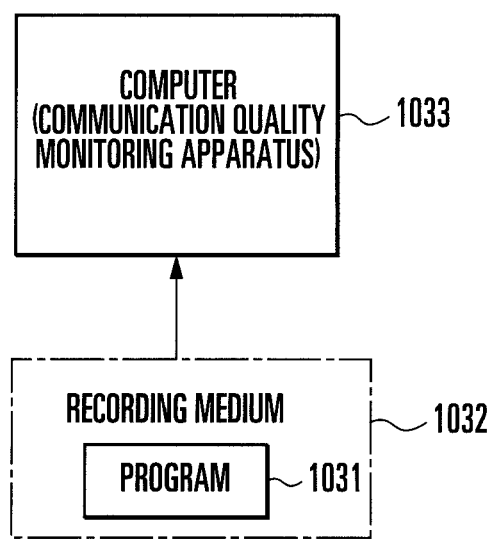
FIG. 17B is a view for explaining a communication quality monitoring apparatus implemented by a computer and a program.

The embodiments of the present invention have been described above. However, the present invention is not limited to the above embodiments, and various additional modifications can be made. The functions of the network management apparatus 90 and communication quality monitoring apparatus 1030 can be implemented not only as hardware but also by a computer and program. As shown in FIG. 17A, a program 91 for the network management apparatus 90 is provided as a program recorded on a computer-readable recording medium 92 such as a magnetic disk or semiconductor memory. When a computer 93 included in the network management apparatus 90 is activated, the program 91 is read out by the computer 93. The program 91 controls the operation of the computer 93 to cause it to function as the network management apparatus 90 in the above-described embodiments. Similarly, as shown in FIG. 17B, a program 1031 for the communication quality monitoring apparatus 1030 is provided as a program recorded on a computer-readable recording medium 1032 such as a magnetic disk or semiconductor memory. When a computer 1033 included in the communication quality monitoring apparatus 1030 is activated, the program 1031 is read out by the computer 1033. The program 1031 controls the operation of the computer 1033 to cause it to function as the communication quality monitoring apparatus 1030 in the above-described embodiments.

The functions and effects of the present invention will be described. The upper probability value represents the likelihood that a communication quality index becomes lower than a measured value. In other words, the upper probability value represents the rareness that a communication quality index becomes equal to or lower than a measured value. For this reason, as the upper probability value becomes smaller, the situation rarely occurs in a normal operation environment and indicates anomaly in the system. In both a binomial distribution and a normal distribution, the upper probability tends to be low as the number of times of measurement increases if the measured value is the same. Hence, anomaly detection errors when the number of times of measurement is small decrease, and it is therefore possible to detect anomaly in consideration of the statistical reliability. The negative logarithm of the upper probability value can be used as the score of the degree of abnormality because it increases as the degree of abnormality of the system becomes large. Since a simultaneous probability for a plurality of indices can be obtained by addition, the calculation is facilitated. Additionally, when the time series of the score of the degree of abnormality does not satisfy the steady condition, a sign of anomaly can be detected. When anomaly in the system or a sign of anomaly is detected, it is possible to maintain the system by changing network operation parameters in accordance with the score of the degree of abnormality.

The invention claimed is:

1. An anomaly detection method characterized by comprising the steps of:
   storing a probability distribution of a communication quality index in a normal operation of a communication network;
   obtaining, on the basis of the stored probability distribution, an upper probability from a sum of probabilities that the communication quality index during a measurement period becomes lower than a measured value; and
   detecting anomaly of the communication network by using the value of the obtained upper probability.

2. The anomaly detection method according to claim 1, characterized in that the obtaining step comprises the step of, when an average failure ratio $p_0$ of communication in the normal operation of the communication network is given in the communication network which uses a failure ratio of communication attempt as the communication quality index, obtaining, on the basis of a communication attempt count a during the measurement period and a communication failure count f during the measurement period, an upper probability $B(a, f, p_0)$ of a binomial distribution representing that the failure count is not less than f.

3. The anomaly detection method according to claim 1, characterized in that the obtaining step comprises the step of, when an average value $q_0$ of an index and a dispersion $q_v$ of the index in the normal operation of the communication network are given in the communication network which uses continuous values containing an average transfer delay amount as the communication quality index, obtaining, on the basis of a transfer frame count e during the measurement period and an average value d of the measured communication quality index, an upper probability $N(d,q_0,q_v/e)$ of a normal distribution representing that the communication quality index is less than the average value d.

4. The anomaly detection method according to claim 1, characterized by further comprising the step of measuring the communication quality index for each subscriber group in a communication network having a plurality of subscriber groups with different target values of communication quality to be provided,
   wherein the obtaining step comprises the step of obtaining the upper probability for each subscriber group, and
   the detecting step comprises the step of detecting degradation in communication quality for each subscriber group by using the value of the obtained upper probability.

5. The anomaly detection method according to claim 1, characterized in that the obtaining step comprises the steps of:

obtaining a score of a degree of abnormality for each of a plurality of communication quality indices on the basis of the upper probability; and executing weighted addition of the scores of the degree of abnormality for the respective communication quality indices, and the detecting step comprises the step of detecting anomaly of the communication network on the basis of a result of weighted addition.

6. The anomaly detection method according to claim 1, characterized in that the obtaining step comprises the step of obtaining a score of a time series degree of abnormality from the communication quality index which is measured a plurality of number of times at a predetermined interval, and the detecting step comprises the steps of:

estimating a coefficient when obtained time series data is applied to an autoregressive model; and determining the communication network as abnormal when the estimated coefficient does not satisfy a steady condition of the autoregressive model.

7. The anomaly detection method according to claim 1, characterized by further comprising the steps of:

causing a mobile terminal in a mobile communication network to measure the communication quality index and periodically transmit a measurement result to a server which manages communication quality; and causing the server to totalize the measurement result of the communication quality index for subscriber groups with the same target value of communication quality to be provided, wherein the obtaining step comprises the step of causing the server to obtain a score of a degree of abnormality on the basis of the upper probability, and the detecting step comprises the step of causing the server to detect degradation in communication quality for each subscriber group in accordance with the obtained score of the degree of abnormality.

8. The anomaly detection method according to claim 1, characterized in that in the obtaining step, at least one of a connection failure count with respect to a connection request count, a handover failure count with respect to a handover request count, a packet transfer throughput, a packet transfer delay, and a packet loss ratio which are measured for each radio cell of the communication network is used as the communication quality index.

9. A maintenance method characterized by comprising the steps of:

storing a probability distribution of a communication quality index in a normal operation of a communication network;

obtaining, on the basis of the stored probability distribution, an upper probability from a sum of probabilities that the communication quality index during a measurement period becomes lower than a measured value;

obtaining a score of a degree of abnormality on the basis of the obtained upper probability; and improving communication quality by changing a network operation parameter related to the communication quality index to generate negative feedback to the score of the degree of abnormality.

10. The maintenance method according to claim 9, characterized in that the upper probability obtaining step comprises the step of, when an average failure ratio $p_0$ of communication in the normal operation of the communication network is given in the communication network which uses a failure ratio of communication attempt as the communication quality index, obtaining, on the basis of a communication attempt count a during the measurement period and a communication failure count f during the measurement period, an upper probability $B(a,f,p_0)$ of a binomial distribution representing that the failure count is not less than f.

11. The maintenance method according to claim 9, characterized in that the upper probability obtaining step comprises the step of, when an average value $q_0$ of an index and a dispersion $q_v$ of the index in the normal operation of the communication network are given in the communication network which uses continuous values containing an average transfer delay amount as the communication quality index, obtaining, on the basis of a transfer frame count e during the measurement period and an average value d of the measured communication quality index, an upper probability $N(d,q_0,q_v/e)$ of a normal distribution representing that the communication quality index is less than the average value d.

12. The maintenance method according to claim 9, characterized in that in the score obtaining step, a score of a time series degree of abnormality is obtained from the communication quality index which is measured a plurality of number of times at a predetermined interval, and the improving step comprises the steps of:

estimating a coefficient when obtained time series data is applied to an autoregressive model;

predicting the score of the degree of abnormality at a next measurement time by using the estimated coefficient; and changing the network operation parameter by using the predicted value of the score of the degree of abnormality to generate negative feedback to the score of the degree of abnormality.

13. The maintenance method according to claim 9, characterized by further comprising the steps of:

causing a mobile terminal in a mobile communication network to measure the communication quality index and periodically transmit a measurement result to a server which manages communication quality;

causing the server to totalize the measurement result of the communication quality index for subscriber groups with the same target value of communication quality to be provided; and causing the server to detect degradation in communication quality for each subscriber group in accordance with the obtained score of the degree of abnormality, wherein in the improving step, the server improves the communication quality for each subscriber group by changing the network operation parameter.

14. The maintenance method according to claim 9, characterized in that in the improving step, the network operation parameter including at least one of a pilot channel transmission power of a radio base station, an outer loop transmission power of downlink data transmitted from a radio base station to a mobile terminal, an outer loop transmission power of up link data transmitted from a mobile terminal to a radio bas station, a call reception control threshold value to be referred to in call connection or handover of a mobile terminal, a radio link addition threshold value reception power referred to by a mobile terminal in handover, a radio link deletion threshold value reception power, and a radio link replacement threshold value reception power is changed to generate negative feedback to the score of the degree of abnormality.

15. An anomaly detection system characterized by comprising:
- storage means for storing a probability distribution of a communication quality index in a normal operation of a communication network; and
- degree-of-abnormality calculation means for obtaining, on the basis of the probability distribution stored in said storage means, an upper probability from a sum of probabilities that the communication quality index during a measurement period becomes lower than a measured value, and detecting anomaly of the communication network by using the value of the upper probability.

16. The anomaly detection system according to claim 15, characterized in that
- said storage means stores an average failure ratio $p_0$ of communication in the normal operation of the communication network in the communication network which uses a failure ratio of communication attempt as the communication quality index, and
- said degree-of-abnormality calculation means obtains, on the basis of a communication attempt count a during the measurement period and a communication failure count f during the measurement period, an upper probability $B(a,f,p_0)$ of a binomial distribution representing that the failure count is not less than f.

17. The anomaly detection system according to claim 15, characterized in that
- said storage means stores an average value $q_0$ of an index and a dispersion $q_v$ of the index in the normal operation of the communication network in the communication network which uses continuous values containing an average transfer delay amount as the communication quality index, and
- said degree-of-abnormality calculation means obtains, on the basis of a transfer frame count e during the measurement period and an average value d of the measured communication quality index, an upper probability $N(d, q_0, q_v/e)$ of a normal distribution representing that the communication quality index is less than the average value d.

18. The anomaly detection system according to claim 15, characterized by further comprising communication quality monitoring means for measuring the communication quality index for each subscriber group in a communication network having a plurality of subscriber groups with different target values of communication quality to be provided,
- wherein said degree-of-abnormality calculation means obtains the upper probability for each subscriber group and detects degradation in communication quality for each subscriber group by using the value of the upper probability.

19. The anomaly detection system according to claim 15, characterized in that said degree-of-abnormality calculation means obtains a score of a degree of abnormality for each of a plurality of communication quality indices on the basis of the upper probability and detects anomaly of the communication network by weighted addition of the scores of the degree of abnormality for the respective communication quality indices.

20. The anomaly detection system according to claim 15, characterized in that said degree-of-abnormality calculation means obtains a score of a time series degree of abnormality from the communication quality index which is measured a plurality of number of times at a predetermined interval, estimates a coefficient when obtained time series data is applied to an autoregressive model, and determines the communication network as abnormal when the estimated coefficient does not satisfy a steady condition of the autoregressive model.

21. The anomaly detection system according to claim 15, characterized by further comprising:
- a mobile terminal and a server which manages communication quality,
- wherein said mobile terminal measures the communication quality index and periodically transmits a measurement result to said server,
- said server comprises:
- communication quality monitoring means for totalizing the measurement result of the communication quality index for subscriber groups with the same target value of communication quality to be provided; and
- said storage means and said degree-of-abnormality calculation means, and
- said degree-of-abnormality calculation means obtains a score of a degree of abnormality on the basis of the upper probability and detects degradation in communication quality for each subscriber group in accordance with the score of the degree of abnormality.

22. The anomaly detection system according to claim 15, characterized in that said degree-of-abnormality calculation means uses, as the communication quality index, at least one of a connection failure count with respect to a connection request count, a handover failure count with respect to a handover request count, a packet transfer throughput, a packet transfer delay, and a packet loss ratio which are measured for each radio cell of the communication network.

23. A maintenance system characterized by comprising:
- storage means for storing a probability distribution of a communication quality index in a normal operation of a communication network; and
- degree-of-abnormality calculation means for obtaining, on the basis of the probability distribution stored in said storage means, an upper probability from a sum of probabilities that the communication quality index during a measurement period becomes lower than a measured value, obtaining a score of a degree of abnormality on the basis of the upper probability, and improving communication quality by changing a network operation parameter related to the communication quality index to generate negative feedback to the score of the degree of abnormality.

24. The maintenance system according to claim 23, characterized in that
- said storage means stores an average failure ratio $p_0$ of communication in the normal operation of the communication network in the communication network which uses a failure ratio of communication attempt as the communication quality index, and
- said degree-of-abnormality calculation means obtains, on the basis of a communication attempt count a during the measurement period and a communication failure count f during the measurement period, an upper probability $B(a,f,p_0)$ of a binomial distribution representing that the failure count is not less than f.

25. The maintenance system according to claim 23, characterized in that
- said storage means stores an average value $q_0$ of an index and a dispersion $q_v$ of the index in the normal operation of the communication network in the communication network which uses continuous values containing an average transfer delay amount as the communication quality index, and said degree-of-abnormality calculation means obtains, on the basis of a transfer frame count e during the measurement period and an average value d of the measured communication quality index, an upper probability $N(d, q_0, q_v/e)$ of a normal distribution representing that the communication quality index is less than the average value d.

26. The maintenance system according to claim 23, characterized in that said degree-of-abnormality calculation means obtains a score of a time series degree of abnormality from the communication quality index which is measured a plurality of number of times at a predetermined interval, estimates a coefficient when obtained time series data is applied to an autoregressive model, predicts the score of the degree of abnormality at a next measurement time by using the estimated coefficient, and changes the network operation parameter by using the predicted value of the score of the degree of abnormality to generate negative feedback to the score of the degree of abnormality.

27. The maintenance system according to claim 23, characterized by further comprising:
a mobile terminal and a server which manages communication quality,
wherein said mobile terminal measures the communication quality index and periodically transmits a measurement result to said server,
said server comprises:
communication quality monitoring means for totalizing the measurement result of the communication quality index for subscriber groups with the same target value of communication quality to be provided; and
said storage means and said degree-of-abnormality calculation means, and
said degree-of-abnormality calculation means obtains a score of a degree of abnormality on the basis of the upper probability, detects degradation in communication quality for each subscriber group in accordance with the score of the degree of abnormality, and improves the communication quality for each subscriber group by changing the network operation parameter to generate negative feedback to the score of the degree of abnormality.

28. The maintenance system according to claim 23, characterized in that said degree-of-abnormality calculation means changes the network operation parameter including at least one of a pilot channel transmission power of a radio base station, an outer loop transmission power of downlink data transmitted from a radio base station to a mobile terminal, an outer loop transmission power of uplink data transmitted from a mobile terminal to a radio base station, a call reception control threshold value to be referred to in call connection or handover of a mobile terminal, a radio link addition threshold value reception power referred to by a mobile terminal in handover, a radio link deletion threshold value reception power, and a radio link replacement threshold value reception power to generate negative feedback to the score of the degree of abnormality.

29. A network management apparatus characterized by comprising:
first storage means for storing a probability distribution of a communication quality index in a normal operation of a communication network;
second storage means for storing the communication quality index during a measurement period; and
degree-of-abnormality calculation means for obtaining, on the basis of the probability distribution stored in said first storage means and the communication quality index stored in said second storage means, an upper probability from a sum of probabilities that the communication quality index during the measurement period becomes lower than a measured value, and detecting anomaly of the communication network by using the value of the upper probability.

30. The network management apparatus according to claim 29, characterized in that
said first storage means stores an average failure ratio $p_0$ of communication in the normal operation of the communication network in the communication network which uses a failure ratio of communication attempt as the communication quality index,
said second storage means stores a communication attempt count a during the measurement period and a communication failure count f during the measurement period, and
said degree-of-abnormality calculation means obtains, on the basis of the stored average failure ratio $p_0$, attempt count a, and failure count f, an upper probability $B(a, f, p_0)$ of a binomial distribution representing that the failure count is not less than f.

31. The network management apparatus according to claim 29, characterized in that
said first storage means stores an average value $q_0$ of an index and a dispersion $q_v$ of the index in the normal operation of the communication network in the communication network which uses continuous values containing an average transfer delay amount as the communication quality index,
said second storage means stores a transfer frame count e during the measurement period and an average value d of the measured communication quality index, and
said degree-of-abnormality calculation means obtains, on the basis of the stored average value $q_0$, dispersion $q_v$, transfer frame count e, and average value d, an upper probability $N(d, q_0, q_v/e)$ of a normal distribution representing that the communication quality index is less than the average value d.

32. A non-transitory computer-readable recording medium storing a program causing a computer to implement functions of an network management method, the functions comprising:
storing a probability distribution of a communication quality index in a normal operation of a communication network;
storing the communication quality index during a measurement period;
obtaining, on the basis of the stored probability distribution and the stored communication quality index, an upper probability from a sum of probabilities that the communication quality index during the measurement period becomes lower than a measured value and
detecting anomaly of the communication network by using the value of the upper probability.

33. The non-transitory computer-readable recording medium according to claim 32, characterized in that
the storing the probability distribution comprises storing an average failure ratio $p_0$ of communication in the normal operation of the communication network in the communication network which uses a failure ratio of communication attempt as the communication quality index,
the storing the communication quality index comprises storing a communication attempt count a during the measurement period and a communication failure count f during the measurement period, and the obtaining the upper probability comprises obtaining, on the basis of the stored average failure ratio $p_0$, attempt count a, and failure count f, an upper probability $B(a,f,p_0)$ of a binomial distribution representing that the failure count is not less than f.

34. The non-transitory computer-readable recording medium according to claim 32, characterized in that the storing the probability distribution comprises storing an average value $q_0$ of an index and a dispersion $q_v$ of the index in the normal operation of the communication network in the communication network which uses continuous values containing an average transfer delay amount as the communication quality index, the storing the communication quality index comprises storing a transfer frame count e during the measurement period and an average value d of the measured communication quality index, and the obtaining the upper probability comprises obtaining, on the basis of the stored average value $q_0$, dispersion $q_v$, transfer frame count e, and average value d, an upper probability $N(d,q_0,q_v/e)$ of a normal distribution representing that the communication quality index is less than the average value d.

35. A communication quality monitoring apparatus characterized by comprising:

first storage means for storing a probability distribution of a communication quality index in a normal operation of a mobile communication network;

second storage means for storing the communication quality index during a measurement period in correspondence with each mobile terminal, the communication quality index being periodically transmitted from each mobile terminal; and degree-of-abnormality calculation means for obtaining, in correspondence with each mobile terminal on the basis of the probability distribution stored in said first storage means and the communication quality index stored in said second storage means, an upper probability from a sum of probabilities that the communication quality index during the measurement period becomes lower than a measured value, and detecting degradation in communication quality by using the value of the upper probability in correspondence with each mobile terminal.

36. The communication quality monitoring apparatus according to claim 35, characterized in that said first storage means stores, in correspondence with each mobile terminal, an average failure ratio $p_0$ of communication in the normal operation of the mobile communication network in the mobile communication network which uses a failure ratio of communication attempt as the communication quality index, said second storage means stores a communication attempt count a during the measurement period and a communication failure count f during the measurement period in correspondence with each mobile terminal, the attempt count a and the failure count f being periodically transmitted from each mobile terminal, and said degree-of-abnormality calculation means obtains, in correspondence with each mobile terminal on the basis of the stored average failure ratio $p_0$, attempt count a, and failure count f, an upper probability $B(a,f,p_0)$ of a binomial distribution representing that the failure count is not less than f.

37. The communication quality monitoring apparatus according to claim 35, characterized in that said first storage means stores, in correspondence with each mobile terminal, an average value $q_0$ of an index and a dispersion $q_v$ of the index in the normal operation of the mobile communication network in the mobile communication network which uses continuous values containing an average transfer delay amount as the communication quality index, said second storage means stores a transfer frame count e during the measurement period and an average value d of the measured communication quality index in correspondence with each mobile terminal, the transfer frame count e and the average value d being periodically transmitted from each mobile terminal, and said degree-of-abnormality calculation means obtains, in correspondence with each mobile terminal on the basis of the stored average value $q_0$, dispersion $q_v$, transfer frame count e, and average value d, an upper probability $N(d,q_0,q_v/e)$ of a normal distribution representing that the communication quality index is less than the average value d.

38. A non-transitory computer-readable recording medium storing a program causing a computer to implement functions of a communication quality monitoring method, the functions comprising:

storing a probability distribution of a communication quality index in a normal operation of a mobile communication network;

storing the communication quality index during a measurement period in correspondence with each mobile terminal, the communication quality index being periodically transmitted from each mobile terminal;

obtaining, in correspondence with each mobile terminal on the basis of the stored probability distribution and the stored communication quality index, an upper probability from a sum of probabilities that the communication quality index during the measurement period becomes lower than a measured value; and detecting degradation in communication quality by using the value of the upper probability in correspondence with each mobile terminal.

39. The non-transitory computer-readable recording medium according to claim 38, characterized in that said storing the probability distribution comprises storing, in correspondence with each mobile terminal, an average failure ratio $p_0$ of communication in the normal operation of the mobile communication network in the mobile communication network which uses a failure ratio of communication attempt as the communication quality index, said storing the communication quality index comprises storing a communication attempt count a during the measurement period and a communication failure count f during the measurement period in correspondence with each mobile terminal, the attempt count a and the failure count f being periodically transmitted from each mobile terminal, and said obtaining the upper probability comprises obtaining, in correspondence with each mobile terminal on the basis of the stored average failure ratio $p_0$, attempt count a, and failure count f, an upper probability $B(a,f,p_0)$ of a binomial distribution representing that the failure count is not less than f.

40. The non-transitory computer-readable recording medium according to claim 38, characterized in that said storing the probability distribution comprises storing, in correspondence with each mobile terminal, an average value $q_0$ of an index and a dispersion $q_v$ of the index in the normal operation of the mobile communication network in the mobile communication network which uses continuous values containing an average transfer delay amount as the communication quality index, said storing the communication quality index comprises storing a transfer frame count e during the measurement period and an average value d of the measured communication quality index in correspondence with each mobile terminal, the transfer frame count e and the average value d being periodically transmitted from each mobile terminal, and said obtaining the upper probability comprises obtaining, in correspondence with each mobile terminal on the basis of the stored average value $q_o$, dispersion $q_v$, transfer frame count e, and average value d, an upper probability $N(d, q_o, q_v/e)$ of a normal distribution representing that the communication quality index is less than the average value d.

* * * * *